(12) United States Patent
Zhang et al.

(10) Patent No.: US 12,056,892 B2
(45) Date of Patent: Aug. 6, 2024

(54) IMAGE PROCESSING METHOD AND APPARATUS, ELECTRONIC DEVICE AND COMPUTER READABLE STORAGE MEDIUM

(71) Applicant: Samsung Electronics Co., Ltd., Suwon-si (KR)

(72) Inventors: Weihua Zhang, Beijing (CN); Changwei Wang, Beijing (CN); Jinfu Wang, Beijing (CN); Ke Lin, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 418 days.

(21) Appl. No.: 17/428,454

(22) PCT Filed: Feb. 18, 2020

(86) PCT No.: PCT/KR2020/002329
§ 371 (c)(1),
(2) Date: Aug. 4, 2021

(87) PCT Pub. No.: WO2020/171550
PCT Pub. Date: Aug. 27, 2020

(65) Prior Publication Data
US 2022/0108542 A1   Apr. 7, 2022

(30) Foreign Application Priority Data

Feb. 18, 2019 (CN) .......................... 201910120691.1
Jun. 6, 2019 (CN) .......................... 201910492428.5
Nov. 26, 2019 (CN) .......................... 201911177083.0

(51) Int. Cl.
| | | |
|---|---|---|
| G06T 7/73 | (2017.01) | |
| G06T 7/11 | (2017.01) | |
| G06V 10/24 | (2022.01) | |
| G06V 10/44 | (2022.01) | |
| G06V 10/764 | (2022.01) | |
| G06V 10/80 | (2022.01) | |
| G06V 10/82 | (2022.01) | |
| G06V 40/10 | (2022.01) | |
| G06V 40/16 | (2022.01) | |

(52) U.S. Cl.
CPC .................. G06T 7/73 (2017.01); G06T 7/11 (2017.01); G06V 10/242 (2022.01);
(Continued)

(58) Field of Classification Search
CPC ... G06T 7/73; G06T 7/11; G06T 2207/20081; G06T 2207/20084; G06T 3/60;
(Continued)

(56) References Cited

U.S. PATENT DOCUMENTS 10,049,297 B1 * 8/2018 Chen ...................... G06V 20/36
2006/0098844 A1   5/2006 Luo
(Continued)

FOREIGN PATENT DOCUMENTS

CN       108629747 A      10/2018
KR  10-2014-0088753 A       7/2014

*Primary Examiner* — Tom Y Lu
(74) *Attorney, Agent, or Firm* — Jefferson IP Law, LLP

(57) ABSTRACT

The disclosure relates to a communication method and system for converging a 5$^{th}$-Generation (5G) communication system for supporting higher data rates beyond a 4$^{th}$-Generation (4G) system with a technology for IoT. The disclosure may be applied to intelligent services based on the 5G communication technology and the IoT-related technology, such as smart home, smart building, smart city, smart car, connected car, health care, digital education, smart retail, security and safety services. An image processing method and apparatus, electronic device and computer readable storage medium, which belong to image processing field are provided. The method and apparatus, electronic device and computer readable storage medium include segmenting an image to be processed to obtain a target region in the image to be processed, and performing style transfer on the target region. The solution provided may effectively improve effects of image processing, and better meet requirements of practical application.

13 Claims, 43 Drawing Sheets

(52) U.S. Cl.
CPC .......... *G06V 10/454* (2022.01); *G06V 10/764* (2022.01); *G06V 10/803* (2022.01); *G06V 10/806* (2022.01); *G06V 10/82* (2022.01); *G06V 40/10* (2022.01); *G06V 40/161* (2022.01)

(58) Field of Classification Search
CPC ......... G06T 3/0012; G06T 3/608; G06T 3/40; G06T 5/001; G06V 10/242; G06V 10/454; G06V 10/764; G06V 10/803; G06V 10/806; G06V 10/82; G06V 40/10; G06V 40/161; G06V 10/267; G06F 18/253
See application file for complete search history.

(56) References Cited

U.S. PATENT DOCUMENTS

| | | |
|---|---|---|
| 2010/0172598 A1 | 7/2010 | Kimura |
| 2012/0081402 A1 | 4/2012 | Liu |
| 2016/0357406 A1 | 12/2016 | Lee et al. |
| 2017/0148222 A1* | 5/2017 | Holzer ................. H04N 23/698 |
| 2018/0350030 A1 | 12/2018 | Simons et al. |
| 2019/0019036 A1 | 1/2019 | Yoo |

* cited by examiner

RELATED ART

FIG. 18A

| 0.0 | 0.0 | 0.0 | 0.0 | 0.0 | 0.1 | 0.0 | 0.0 | 0.0 | 0.0 | 0.0 |
|-----|-----|-----|-----|-----|-----|-----|-----|-----|-----|-----|
| 0.0 | 0.0 | 0.0 | 0.1 | 0.1 | 0.2 | 0.1 | 0.1 | 0.0 | 0.0 | 0.0 |
| 0.0 | 0.0 | 0.1 | 0.1 | 0.2 | 0.3 | 0.3 | 0.4 | 0.3 | 0.1 | 0.0 |
| 0.0 | 0.1 | 0.2 | 0.4 | 0.6 | 0.5 | 0.6 | 0.7 | 0.4 | 0.1 | 0.0 |
| 0.0 | 0.1 | 0.3 | 0.5 | 0.7 | 0.8 | 0.9 | 0.8 | 0.5 | 0.1 | 0.0 |
| 0.0 | 0.1 | 0.3 | 0.6 | 0.8 | 1.0 | 0.9 | 0.8 | 0.6 | 0.2 | 0.0 |
| 0.0 | 0.1 | 0.4 | 0.7 | 0.8 | 1.0 | 1.0 | 0.9 | 0.7 | 0.5 | 0.0 |
| 0.0 | 0.1 | 0.5 | 0.8 | 1.0 | 1.0 | 1.0 | 1.0 | 0.8 | 0.4 | 0.0 |
| 0.2 | 0.4 | 0.7 | 1.0 | 1.0 | 1.0 | 1.0 | 1.0 | 1.0 | 0.8 | 0.5 |

FIG. 18B

| 0.0 | 0.0 | 0.0 | 0.0 | 0.0 | 0.0 | 0.0 | 0.0 | 0.0 | 0.0 | 0.0 |
|-----|-----|-----|-----|-----|-----|-----|-----|-----|-----|-----|
| 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 1.0 | 0.0 | 1.0 | 1.0 | 0.0 | 0.0 | 0.0 |
| 0.0 | 0.0 | 0.0 | 0.0 | 1.0 | 1.0 | 1.0 | 1.0 | 0.0 | 0.0 | 0.0 |
| 0.0 | 0.0 | 0.0 | 1.0 | 1.0 | 1.0 | 1.0 | 1.0 | 1.0 | 0.0 | 0.0 |
| 0.0 | 0.0 | 0.0 | 1.0 | 1.0 | 1.0 | 1.0 | 1.0 | 1.0 | 0.0 | 0.0 |
| 0.0 | 0.0 | 0.0 | 1.0 | 1.0 | 1.0 | 1.0 | 1.0 | 1.0 | 0.0 | 0.0 |
| 0.0 | 0.0 | 1.0 | 1.0 | 1.0 | 1.0 | 1.0 | 1.0 | 1.0 | 1.0 | 0.0 |

FIG. 18C

| 0.0 | 0.0 | 0.0 | 0.0 | 0.0 | 0.0 | 0.0 | 0.0 | 0.0 | 0.0 | 0.0 |
|---|---|---|---|---|---|---|---|---|---|---|
| 0.0 | 0.0 | 0.0 | 0.0 | 0.0 | 0.0 | 0.0 | 0.0 | 0.0 | 0.0 | 0.0 |
| 0.0 | 0.0 | 0.0 | 0.0 | 0.0 | 0.17 | 0.17 | 0.67 | 0.17 | 0.0 | 0.0 |
| 0.0 | 0.0 | 0.0 | 0.33 | 0.67 | 0.50 | 0.67 | 0.83 | 0.33 | 0.0 | 0.0 |
| 0.0 | 0.0 | 0.17 | 0.50 | 0.83 | 1.0 | 1.0 | 1.0 | 0.50 | 0.0 | 0.0 |
| 0.0 | 0.0 | 0.17 | 0.67 | 1.0 | 1.0 | 1.0 | 1.0 | 0.67 | 0.0 | 0.0 |
| 0.0 | 0.0 | 0.33 | 0.83 | 1.0 | 1.0 | 1.0 | 1.0 | 0.83 | 0.50 | 0.0 |
| 0.0 | 0.0 | 0.50 | 1.0 | 1.0 | 1.0 | 1.0 | 1.0 | 1.0 | 0.33 | 0.0 |
| 0.0 | 0.33 | 0.83 | 1.0 | 1.0 | 1.0 | 1.0 | 1.0 | 1.0 | 1.0 | 0.50 |

IMAGE PROCESSING METHOD AND APPARATUS, ELECTRONIC DEVICE AND COMPUTER READABLE STORAGE MEDIUM

CROSS-REFERENCE TO RELATED APPLICATION(S)

This application is a U.S. National Stage application under 35 U.S.C. § 371 of an International application number PCT/KR2020/002329, filed on Feb. 18, 2020, which is based on and claims priority of a Chinese patent application number 201910120691.1, filed on Feb. 18, 2019, in the Chinese Intellectual Property Office, of a Chinese patent application number 201910492428.5, filed on Jun. 6, 2019, in the Chinese Intellectual Property Office, and of a Chinese patent application number 201911177083.0, filed on Nov. 26, 2019, in the Chinese Intellectual Property Office, the disclosure of each of which is incorporated by reference herein in its entirety.

BACKGROUND

1. Field

The disclosure relates to a technical field of image processing. More particularly, the disclosure relates to an image processing method and apparatus, an electronic device and a computer readable storage medium.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Deep learning method has accelerated development in the field of computer vision, and machine may more quickly and accurately identify multimedia information. The popularity of smart terminals, especially mobile terminals, has caused a significant increase in image data, and people's entertainment needs for images have soared. The image style transfer is an urgent need for image editing and processing by users. How to improve effects of image processing have always been an important aspect of research in the field of image processing.

Aspects of the disclosure are to address at least the above-mentioned problems and/or disadvantages and to provide at least the advantages described below. Accordingly, an aspect of the disclosure is to provide an image processing method and apparatus, electronic device and computer readable storage medium that may effectively improve image processing effects.

Additional aspects will be set forth in part in the description which follows and, in part, will be apparent from the description, or may be learned by practice of the presented embodiments.

In accordance with an aspect of the disclosure, an image processing method is provided. The image processing method includes segmenting an image to be processed to obtain a target region in the image to be processed, and performing style transfer on the target region.

In accordance with another aspect of the disclosure, an image processing apparatus is provided. The image processing apparatus includes an image segmentation module, configured to segment an image to be processed to obtain a target region in the image to be processed, and an image style transfer module, configured to perform style transfer on the target region.

In accordance with another aspect of the disclosure, an electronic device is provided. The electronic device includes a processor and a memory, wherein the memory is configured to store a machine-readable instruction, and the processor is configured to perform the method according to the first aspect when executing the machine-readable instruction.

In accordance with another aspect of the disclosure, a computer-readable storage medium, on which a computer instruction is stored is provided. When the computer instruction is executed by a processor, the method according to the first aspect is performed.

The technical solutions provided in the application have the following advantages. In the solutions provided in the embodiments of the application, when performing the image style on the image to be processed, by segmenting the image to be processed to obtain the target region in the image to be processed, the style transfer on the target region is achieved. Therefore, those solutions may effectively improve the effects of image style transfer, better meet requirements of practical application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following the description taken in conjunction with the accompanying drawings, in which:

FIG. 18A is a schematic diagram illustrating an image probability distribution map according to an embodiment of the disclosure;

FIG. 18B is a schematic diagram illustrating a probability distribution map after binarizing the probability distribution map shown in FIG. 18A according to the related art;

FIG. 18C is a schematic diagram illustrating a probability distribution map after a linear transformation is performed on the probability distribution map shown in FIG. 18A in an example according to an embodiment of the disclosure;

Throughout the drawings, it should be noted that like reference numbers are used to depict the same or similar elements, features, and structures.

DETAILED DESCRIPTION

Figure 1:
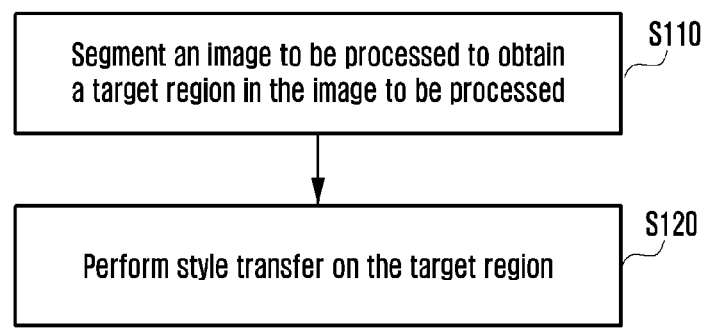
FIG. 1 is a flowchart diagram illustrating an image processing method according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a", "an", "the" include plural referents unless the context clearly dictates otherwise. Thus, for example, reference to "a component surface" includes reference to one or more of such surfaces.

It should be further understood that terms "include/including" used in this specification specify the presence of the stated features, integers, operations, elements and/or components, but not exclusive of the presence or addition of one or more other features, integers, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to better understand the solutions provided by the embodiments of the application, the following firstly briefly describes related techniques involved in the application.

Style transfer is a transfer method from image to image, which may be realized by the current popular deep learning-based image generation method. Deep learning method enables the machine to more quickly and accurately identify multimedia information, especially data information related to a person, such as face and human posture. How to achieve accurate segmentation of portrait in an image is a very important research filed, especially for the lightweight and real-time requirements of a mobile terminal, which makes it possible to further achieve different treatments on portrait or background, to achieve various entertainment functions, and to better meet people's actual application needs.

In addition, the popularity of mobile terminals such as smartphones has caused a significant increase in image data, and people's entertainment needs for images have soared. Style transfer is urgently required for image editing and processing by users, and is also an important research direction of neural network. Due to the complexity of the neural network, the processing speed of the neural network-based style transfer processing on mobile device with limited storage space and computing power is slow and thus difficult to meet needs of users.

After research, the inventors of the application have found that the existing image processing methods have at least the following technical problems or areas that need to be improved.

1) When a user edits an image, image rotation editing may be performed, and an object (such as a person) in the image may be rotated accordingly. At this time, the direction of the object may be not in the normal vertical or horizontal direction, that is, there is a large rotation angle (may also be referred to as a deflection angle) between central axes of the object and the image. Alternatively, it may be considered that the posture of the object in the image is in an abnormal posture or an unusual posture. In addition, when the user takes a picture, the shooting device may not be horizontal placed. At this time, the direction of the obtained object in the image may be not in the normal vertical or horizontal direction, that is, the posture of the object is in abnormal posture. If style transfer processing is performed on a rotated image or an image taken in a non-vertical or non-horizontal direction, accuracy of determining the region corresponding to the object in the image in the prior art is low, resulting in poor final style transfer effect. The network that determines the region corresponding to the object in the image may be referred to as a region segmentation network, an object segmentation network, a segmentation network, an object segmentation model, a region segmentation model, a segmentation model, etc. That is, an abnormal posture of the object in the image leads to a low segmentation accuracy of the object segmentation model in the prior art. Even when training the object segmentation model by using images containing objects with abnormal postures, it is difficult to cover all situations. This training method also possibly affects the segmentation accuracy on an object with normal posture.

2) In the prior art, the edge extraction method is mostly used to determine the region of a target object. However, the edge extraction method may not distinguish object categories, for example, may not distinguish whether the object is a person or an animal. Therefore, when the user is performing the style transfer on an image, the category of object may not be flexibly chosen. In addition, if there is an overlap region between two objects, the regions of the two objects may not be accurately extracted by using the edge extraction method. In summary, the accuracy and flexibility of the method for determining the object region in the prior art are both low.

3) When the user takes a picture and the proportion of a person in the entire image is small, the accuracy is low if the target person region is determined in the entire image.

4) Due to the complexity of the network, the object segmentation model and style transfer model in the prior art have a slower processing speed when implemented on a terminal device. Therefore, the possibility of implementation on the terminal device is low or the effect of implementation on the terminal device is poor, and it is difficult to guarantee the real-time of the processing. The style transfer model needs multiple iterations during processing, so the processing is very time-consuming and a real-time style transfer may not be achieved.

5) In the prior art, when performing the style transfer on an image, fusion effect of a transition region (that is, an edge part of different regions) between a foreground part and a background part in the image is not ideal. For example, a saw tooth edge may appear, which leads to an unnatural edge part and poor visualization.

With respect to at least one of the foregoing technical problems or areas that need to be improved in the prior art, embodiments of the application provide an image processing method and device, an electronic device, and a computer-readable storage medium to improve the effect of processing on an image, and to better meet actual application needs.

The following specifically describes the technical solutions of the application and how the technical solutions of the application solve the foregoing technical problems with reference to specific embodiments. The following specific embodiments may be combined with each other. The same or similar concepts or processes may not be repeated in some embodiments. The embodiments of the application will be described below with reference to the drawings.

FIG. 1 is a flowchart diagram illustrating an image processing method according to an embodiment of the disclosure.

Referring to FIG. 1, the method may include the following operations:

At operation S110, segmenting an image to be processed to obtain a target region in the image to be processed; and At operation S120, performing style transfer on the target region.

The image to be processed may be any image that needs to be style-transferred. For example, it may be an image captured by an image acquisition device (such as a camera on a mobile terminal), or may be an image received from another device or acquired from the network side, or further may be an image after undergoing other editing process. The image to be processed may be an image selected by a user for processing, or an image that needs to be processed automatically. For example, in an application scenario, if it is preconfigured that all or part of the captured images, received images, or images acquired by other methods are automatically transferred in style, these images are the images to be processed.

It may be understood that, in the embodiments of the application, the target region refers to an image region that needs to be processed in the image to be processed. Specifically, when the style transfer is required to be performed on an image, the target region refers to an image region that needs to be transferred in style in the image to be processed. The target region may be one or more of a foreground image region, a background image region, and an image region where at least one object or at least one type of object is located in the image to be processed. In practical application, which region in the image is specifically the target region may be configured according to the actual needs, or the terminal device may automatically determine the target region according to a pre-configured requirement (for example, the terminal device pre-configures to transfer the style of a person in the foreground part, then the terminal device may automatically determine that the target region in the image is the region where the person is located in the foreground part), or the user may specify the target region according to actual needs. By segmenting the image to be processed, the image may be segmented to several regions. Specifically, the image may be segmented based on the object in the image to obtain the target region in the image, that is, the region that needs to be style-transferred. For example, if the region that needs to be style-transferred is the foreground image region or background image region, the image may be segmented to the foreground image region and the background image region to obtain the target region. For another example, if the target region is an image region where a category of object is located in the image to be processed, the image may be segmented based on the category of the object, to obtain the target region, that is, the image region where this kind of object is located, based on the segmentation result.

In addition, it should be noted that, in the embodiments of the application, the object in the image to be processed refers to all or part of the subjects in the image except the background part, that is, all or part of the foreground objects in the image, or foreground object that meets a set condition in the image. It may be understood that the subject in the image may include, but is not limited to, a person, an animal, a building, etc. in the image. For example, for a portrait image, the object in the image may include a person in the image, and for an image including a person and an animal, the object in the image may include at least one of the person and animal in the image, or may be a specified object in the image. The aforesaid specified object may be at least one object in the image, which may be specified by a user or pre-configured by the system. For example, in an actual application, if a user specifies that it is a person in an image to be processed that needs to be stylized, the person is the specified object, and the region where the person is located in the image to be processed is the target region in the image to be processed.

In addition, the demarcation of the foreground and background in the image may be defined based on the image content, or may be defined based on the configuration information, which may be pre-configured by the system or configured by the user according to requirement. For example, the configuration information may specify which attribute or type, i.e., category of information is the foreground of the image, then the portion of the image to be processed that matches the configuration information is the foreground part of the image, and the remaining part is the background part of the image.

It should also be noted that the target region that needs to be stylized may be one region or multiple regions. When there are multiple target regions, all the target regions may correspond to the same image style or may correspond to multiple image styles. In addition, it is possible that the entire image to be processed needs to be stylized. For example, the image to be processed may be segmented to the foreground image region and the background image region, and these two regions both are the target regions. The foreground image region needs to be transferred to a style and the background image region needs to be transferred to another style.

For convenience of description, the image to be processed may be simply referred to as an original image hereinafter.

It may be understood that after the style transfer of the target region is completed, if the original image is segmented to a target region and a non-target region, in order to obtain a complete stylized image, the method in the embodiment of the application may further include:

fusing the stylized target region with the non-target region in the original image to obtain the target image (that is, the final image after the original image being stylized).

If the entire original image is needed to be stylized, that is, the original image is segmented to target regions, after completing the style transfer of each target region, the method may further include: fusing the stylized target regions to obtain the target image.

In the embodiment of the application, in the above operation S120, when performing the style transfer on the target region, the style transfer may be performed on the entire image to be processed, or may be performed only on the target region. Two different transfer methods are specifically described below by using two examples.

In one example, when performing the style transfer, the style transfer may be performed on the entire original image. In this example, the target region may be at least one of a foreground image region and a background image region in the image. Specifically, if the user chooses to transfer the foreground image of the original image to a first target style and not change the background image, the entire original image may be transferred to the first target style when performing the style transfer, and then during post-processing, the region of the foreground image in the style transferred image is fused with the background image in the original image before transfer to obtain the target image. Or, if the user chooses to transfer the background image to a second target style and not change the foreground image, the entire original image may be transferred to the second target style when performing the style transfer, and then during post-processing, the region of the background image in the style transferred image is fused with the region of the foreground image in the original image before transfer, according to the object segmentation result, to obtain the target image. Or, if the user chooses to transfer the foreground image to the first target style and the background image to the second target style, when performing the style transfer, the entire original image may be transferred to the first target style and the second target style respectively, and then during the post-processing, the region of the foreground image in the image transferred to the first target style is fused with the region of the background image in the image transferred to the second target style, according to the object segmentation result, to obtain the target image.

In another example, when performing the style transfer, the style transfer may be performed only on the region that needs to be stylized, that is, the target region. Specifically, if the user chooses to transfer the foreground image to the first target style and not change the background image (i.e., the target region is the foreground image region), when performing the style transfer, only the region of the foreground image is transferred to the first target style based on the object segmentation result, and then during the post-processing, the stylized region of the foreground image is fused with the background image in the original image. Or, if the user chooses to transfer the background image to the second target style and not change the foreground image, (i.e., the target region is the background image region), when performing the style transfer, only the background image region is transferred to the second target style based on the object segmentation result, and then during the post-processing, the stylized region of the background image is fused with the region of the foreground in the original image. Or, if the user chooses to transfer the foreground image to the first target style and the background image to the second target style (that is, the target region includes the foreground image and the background image), when performing the style transfer, the foreground image region is transferred to the first target style, and the background image region is transferred to the second target style based on the object segmentation result, and then during the post-processing, the region of the foreground object after transferred to the first target style is fused with the background image region after transferred to the second target style.

In the image processing method provided in the embodiment of the application, when the style transfer is performed on the image to be processed, by segmenting the image to be processed, the target region that needs to be stylized is obtained based on the image segmentation result, thereby achieving the style transfer of the target region in the image to be processed. Based on this method, the effect of the style transfer of the image may be effectively improved.

It should be noted that in the embodiment of the application, the image to be processed may be segmented directly, or may be segmented after a certain preprocessing on the object to be processed, such as detecting each object region in the image to be processed and then performing the style transfer on each object region, or after merging the object regions and then segmenting the merged image, or performing rotation correction on the image to be processed and then performing image segmentation based on the corrected image.

In an optional embodiment of the application, in the above operation S110, the segmenting the image to be processed may specifically include: predicting a rotation angle corresponding to the image to be processed; performing rotation correction on the image to be processed according to the rotation angle; and segmenting the corrected image to be processed.

When the style transfer processing is performed on a rotated image or an image captured at a non-horizontal or non-vertical direction, in the prior art, when segmenting the image to be processed, the image is generally directly input to an object segmentation model for object segmentation. When there is a large rotation angle between the object in the image and the central axis of the image, the accuracy of the segmentation result output from the model is low, so that the effect of the final style transfer is poor.

To solve this problem, in the solution in the embodiment of the application, before segmenting the image to be processed to obtain the target region, for an image that has been rotated by the user during image editing processing, or an image captured at a non-horizontal or non-vertical direction, the rotation angle required to correct the image, i.e., the rotation angle corresponding to the image to be processed, may be predicted. Based on the predicted rotation angle, the image may be segmented after the image being corrected, to obtain the target region in the image. The segmentation effect of the image to be processed may be improved, and the accuracy of the obtained target region may be improved.

It should be noted that, in actual application, after predicting the rotation angle corresponding to the image to be processed, if the rotation angle is not 0 degree, the rotation correction on the image may be performed based on the rotation angle. Alternatively, it may be determined firstly whether the rotation angle satisfies a certain condition. For example, if a preset condition is satisfied, the rotation correction process may be performed, and if the preset condition is not satisfied, the rotation correction may not be performed. For example, when the rotation angle is not within a preset angle range, the rotation correction may not be performed.

In an optional embodiment of the application, the predicting the rotation angle corresponding to the image to be processed may specifically include: detecting a first object region where the object is located in the image to be processed; and predicting a rotation angle corresponding to the first object region, which is considered as the rotation angle corresponding to the image to be processed.

That is, in addition to using the rotation angle of the image to be processed as the rotation angle corresponding to the image to be processed, the rotation angle corresponding to the region where the object is located in the image to be processed may also be used as the rotation angle corresponding to the image to be processed, that is, the rotation angle corresponding to part of the image to be processed may be used as the rotation angle corresponding to the image to be processed.

Figure 2:
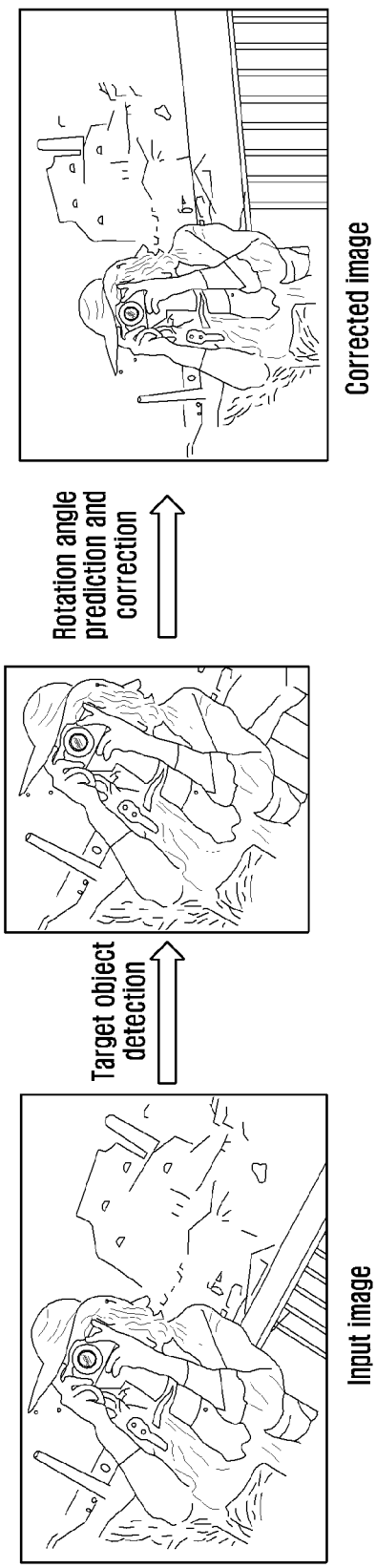
FIG. 2 is a schematic diagram illustrating a scheme for rotation correcting an image in an example according to an embodiment of the disclosure.

FIG. 2 is a schematic diagram illustrating a scheme for rotation correcting an image in an example according to an embodiment of the disclosure.

Referring to FIG. 2, the input image shown is the image to be processed in this example. The detection of the region where the object is located, i.e., the target object detection shown, may firstly performed on the input image. The first object region in this example is the region where the person shown is located in the input image (the image in the middle part shown in FIG. 2). Then the rotation angle of the first object region is predicted, and the rotation correction, i.e., the rotation angle prediction and correction shown, may be performed on the image to be processed based on the rotation angle, to obtain a rotation corrected image, i.e., the corrected image.

In an optional embodiment of the application, the descried-above first object region may be an object region meeting a preset condition. The preset condition may include at least one of the following:

an object region at a specified position, a region where a specified object is located, a region where an object of a specified category is located, and an object region satisfying a preset region size.

That is, the object regions in the original image may be filtered, and further processing is performed only based on the object region that meets the preset condition to reduce the amount of data to be processed and thus improve the data processing efficiency. The preset condition may be configured according to actual requirement, and may specifically be a system configuration, or may be set by a user based on needs. The object region that meets the preset condition may specifically mean that the object in the image to be processed meets the preset condition, or the region where the object is located meets the preset condition (for example, the first object region is a region where a specified object is located). For example, it may be that the type or category of the object meets the preset condition (for example, the first object region is a region where an object of a specified category is located), or the location and/or size of the region where the object is located meets the preset condition (for example, the first object region is an object region at a specified position or an object region satisfying a preset region size).

Figure 3:
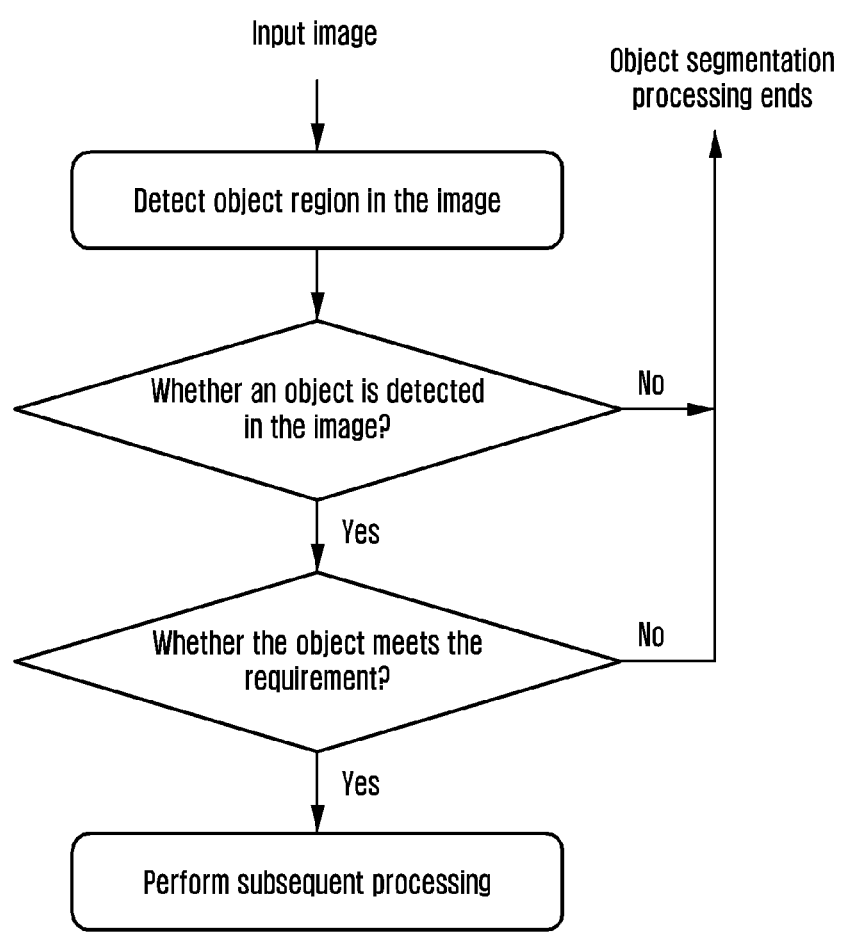
FIG. 3 is a flowchart diagram illustrating a scheme for preprocessing an image to be processed in an example according to an embodiment of the disclosure.

FIG. 3 is a flowchart diagram illustrating a scheme for preprocessing an image to be processed in an example according to an embodiment of the disclosure.

Referring to FIG. 3, it shows a schematic flowchart of preprocessing the object to be processed before segmenting the object to be processed. Before segmenting the image to be processed (the input image), an image detection model is firstly used to detect whether there is an object in the image to be processed, that is, detect an object region in the image. In addition, when the output of the image detection model shows that there is no object in the image, it is unnecessary to segment the object, that is, it is not necessary to input the image into an object segmentation model, and the object segmentation processing ends to reduce unnecessary workload. Especially when batch of images or video image sequences need to be processed, the advantage of this method is more obvious. When the output of the image detection model shows that there is an object in the image, an object filtering may be further performed, that is, it is determined whether there is an object that meets the preset condition, in the image. For example, it may be determined whether the object meets the requirement. Specifically, as an optional solution, the above requirement may be set in advance with respect to position and/or size of the object. For example, it may be preset that the object is considered to meet the requirement only when the size of the object region meets a preset size. When the object meets the preset condition, subsequent processing is performed, such as rotation correction of the image, and object segmentation processing on the image are performed. When the object does not meet the preset condition, the image may not be segmented.

In an optional embodiment of the application, the predicting the rotation angle corresponding to the image to be processed may include: determining the rotation angle corresponding to the image to be processed, according to a rotation angle of an object in the image to be processed.

As an optional manner, in practical application, the rotation angle corresponding to the image to be processed may be determined based on the rotation angle of the object included in the image to be processed. Specifically, for example, the rotation angle of the object included in the image to be processed or the rotation angle of the object in the first object region in the image to be processed may be used as the rotation angle corresponding to the image to be processed. As shown in the example shown in FIG. 2, the rotation angle of the person may be used as the rotation angle corresponding to the image to be processed in this example, and the image to be processed is rotation corrected according to the rotation angle, to obtain the corrected image.

Figure 4:
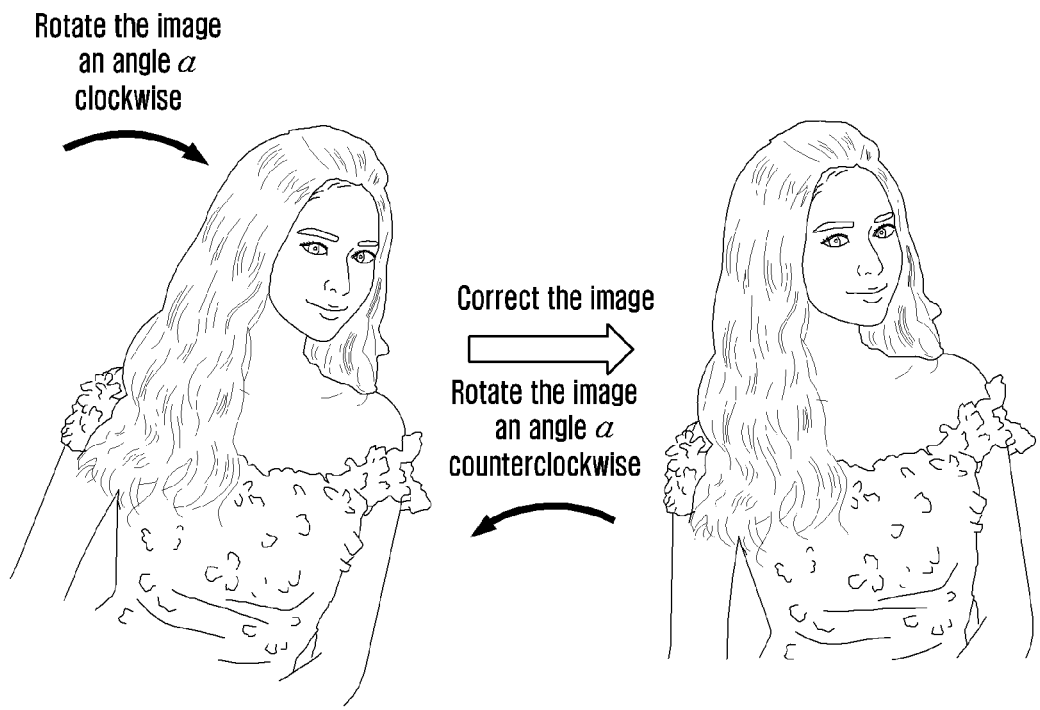
FIG. 4 is a schematic diagram illustrating a scheme for rotation correcting an image in an example according to an embodiment of the disclosure.

FIG. 4 is a schematic diagram illustrating a scheme for rotation correcting an image in an example according to an embodiment of the disclosure.

Referring to FIG. 4, for another example, for the image including the person object, if a detected clockwise rotation angle of the person object on the image plane is a, the image may be rotated the angle $\alpha$ counterclockwise to make the person vertical on the image plane (which may be regarded as a normal posture, or a regular posture), and subsequent processing may be performed on the rotation corrected image to improve the image processing effect.

In an optional embodiment of the application, when the image to be processed includes at least two objects, the determining the rotation angle corresponding to the image to be processed according to the rotation angle of the object in the image to be processed, may include:

determining the rotation angle of an object with the largest area ratio in the image to be processed as the rotation angle corresponding to the image to be processed, or fusing the rotation angles of the objects in the image to be processed, and determining the fused rotation angle as the rotation angle corresponding to the image to be processed, or determining the rotation angles of the objects as the rotation angle corresponding to the image to be processed, respectively.

As an optional manner, when the rotation angles of the objects are determined as the rotation angle corresponding to the image to be processed respectively, the performing rotation correction on the image to be processed according to the rotation angle, may specifically include:

performing the rotation correction on the regions where the objects are located separately according to the corresponding rotation angles respectively, and correspondingly, the segmenting the corrected image to be processed includes:

segmenting the rotation corrected regions where the objects are located separately, and then fusing segmentation results of the regions where the objects are located separately to obtain the segmentation result of the image to be processed, or, merging the rotation corrected regions where the objects are located separately, and segmenting the merged image to obtain the segmentation result of the image to be processed.

For the case where the image contains multiple (including two) objects or where multiple objects meet the preset condition, the rotation correction may be performed on the image to be processed based on the rotation angle of a single object with the largest area ratio in the image (that is, the object in the first object region with the largest area in the image to be processed); or the rotation angles for the objects may be predicated respectively, the rotation angles of the objects are fused to obtain a fused rotation angle, and the image is corrected based on the fused rotation angle. The manner of fusion of the rotation angles is not limited in the embodiment of the application, and may include, but is not limited to, performing average fusion or weighted fusion on multiple rotation angles. In addition, the rotation angles for the objects in the image are calculated respectively, the correction processing may be performed on the region where each object is located according to the rotation angle corresponding thereto, and the segmentation processing is performed on the corrected region corresponding to each object to obtain each segmentation result and the segmentation results are merged together to obtain the segmentation result of the entire image; or to avoid the impact of segmentation processing on multiple object regions on the image processing speed, the corrected regions where the objects are located may be merged into one image, and the merged image is segmented once, and the segmentation result of each object is obtained based on corresponding region in the segmentation result, and those segmentation results are merged together to obtain the segmentation result of the entire image.

In an optional embodiment of the application, the predicting the rotation angle corresponding to the image to be processed may include the following two manners.

Manner 1: the rotation angle corresponding to the image to be processed is predicted through an angle prediction model, wherein the angle prediction model includes an image feature extraction module, and the number of batch normalization (BN) layers in at least one feature extraction unit of the image feature extraction module is less than a set value.

For this manner, the rotation angle corresponding to the image to be processed, such as the rotation angle of the object in the image to be processed, may be obtained through the angle prediction model. Specifically, by training an angle prediction model based on a deep neural network, a rotation angle of an image including any content such as a person, an architecture, nature, and scenery relative to an axis of the image is obtained.

In practical application, the rotation angle may be expressed by a rotation angle in a clockwise direction or a rotation angle in a counterclockwise direction. For convenience of description, hereinafter, unless otherwise specified, the rotation angles are all described by taking clockwise as an example. In addition, the rotation angle described in the embodiments of the application may be an actual rotation angle value, or an angle range corresponding to the rotation angle, for example, may be any value between 0 and 360 degrees, or may be an angle range containing the real rotation angle of the object, such as 0 to 15 degrees, 16 to 30 degrees, 31 to 45 degrees, and so on. That is, in practical application, in addition to the rotation angle value, the range containing the rotation angle of the object may also be used as the rotation angle of the object after the rotation angle space is (that is, 0 to 360 degrees) divided into multiple angle ranges. At this time, a rotation angle value may be configured to corresponding to an angle range, and when the angle range containing the rotation angle of the object is determined, the rotation correction may be performed according to the rotation angle value corresponding to the angle range.

Figure 5:
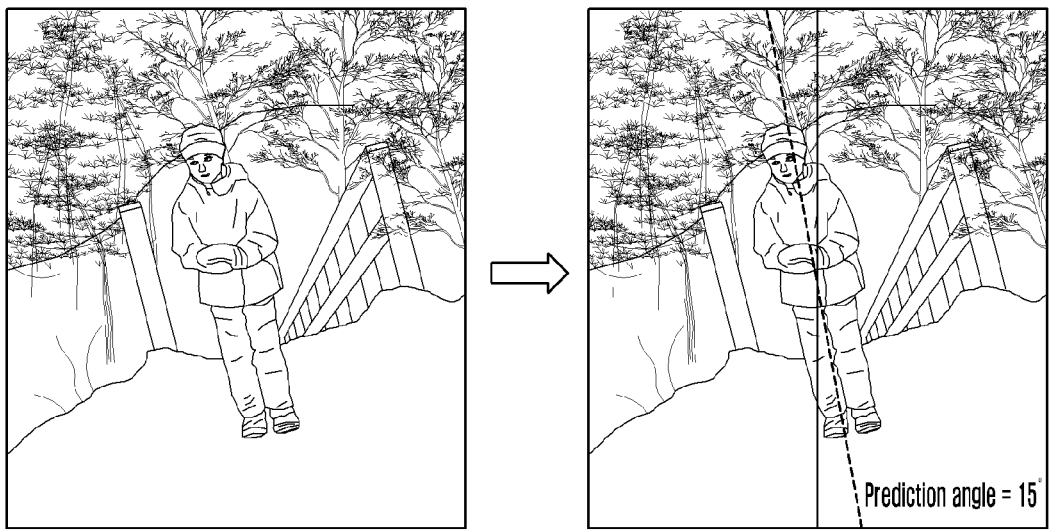
FIG. 5 is a schematic diagram illustrating a scheme for predicting a rotation angle corresponding to an image to be processed in an example according to an embodiment of the disclosure.

FIG. 5 is a schematic diagram illustrating a scheme for predicting a rotation angle corresponding to an image to be processed in an example according to an embodiment of the disclosure.

Figure 6:
FIG. 6 is a flowchart diagram illustrating a scheme for predicting a rotation angle corresponding to an image to be processed in an example according to an embodiment of the disclosure.

Referring to FIG. 5, as an example, for an image to be processed as shown in FIG. 5, a schematic flowchart of predicting the rotation angle of an object in the image by using an angle prediction model obtained by training it in advance is shown in FIG. 6. Specifically, the image to be processed may be the input image of the deep neural network, the feature extraction is performed on the input image by the deep neural network, and the rotation angle is predicted based on the extracted feature information. As shown in FIG. 5, the rotation angle of the person (the predicted angle) is 15 degrees, that is, the deflection angle of the person in FIG. 5 relative to the vertical central axis of the image is 15 degrees.

When performing image processing through the neural network, due to the complexity of the neural network, the processing speed of implementing the neural network-based style transfer processing on a mobile terminal device with limited storage space and computing power is slow, so it is difficult to meet the needs of users. Therefore, how to perform a lightweight optimization on the neural network so that the optimized neural network is also suitable for the mobile terminal device, but not limited to deployment on the mobile terminal device, is also one of the important issues need to be solved.

FIG. 6 is a flowchart diagram illustrating a scheme for predicting a rotation angle corresponding to an image to be processed in an example according to an embodiment of the disclosure.

Referring to FIG. 6, with respect to this problem, in Manner 1 of the embodiment of the application, when performing feature extraction through the deep neural network, a lightweight feature extraction module may be used (corresponding to the lightweight feature extraction in FIG. 6) to be suitable for running on the mobile terminal device, that is, the number of BN layers in at least one feature extraction unit of the image feature extraction module is less than the set value. By reducing the number of BN layers of the feature extraction unit, the overall structure of the neural network is concise, and the calculation amount of the neural network and the occupation of device memory during image processing are reduced, thereby improving the portability and generality of the neural network, so that the neural network may be deployed on mobile terminal device with limited resources.

The above-mentioned number of BN layers being less than the set value means that the number of BN layers in the feature extraction unit is less than the number of BN layers in the existing feature extraction unit commonly used. That is, the maximum value of the set value may be the number of BN layers in the existing feature extraction unit commonly used. Of course, the set value may also be zero, that is, at least one feature extraction unit of the image feature extraction module in the example of the application may not include the BN layer.

Figure 7A:
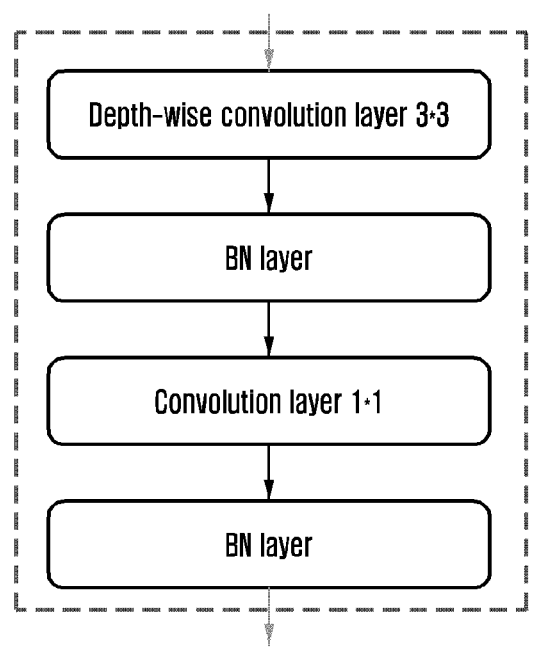
FIG. 7A is a schematic structural diagram illustrating an existing feature extraction unit of an angle prediction model according to an embodiment of the disclosure.

FIG. 7A is a schematic structural diagram illustrating an existing feature extraction unit of an angle prediction model according to an embodiment of the disclosure.

Referring to FIG. 7A, it is a schematic structural diagram illustrating a basic unit for one (in practical application, one or more may be used) feature extraction, that is, a feature extraction unit (portion shown in the dashed box), in the prior art MobileNetV2. The feature extraction unit may be composed of depth-wise convolution layers, several BN layers, and convolution layers, to output image feature information. The BN layer may be deployed between the two adjacent convolution layers (the depth-wise convolution layer and the convolution layer), among which the convolution layer and the depth-wise convolution layer are in charge of completing the basic feature extraction function, and the BN layer is used for assisting the convolution layers. The BN layer may speed up and facilitate training process of deep learning neural network. In some networks, the existence of the BN layer is critical, that is, it may cause the entire network to fail to converge and work properly without using the BN layer. However, in other networks, the training process and normal work may be completed even without using the BN layer.

Figure 7B:
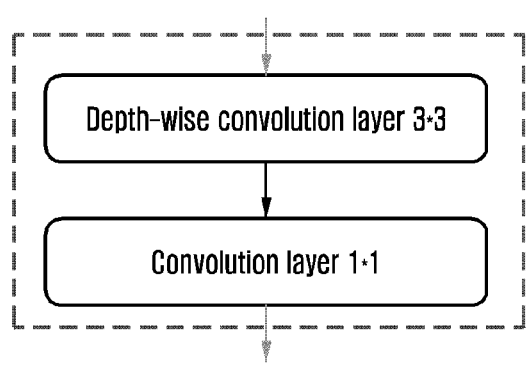
FIG. 7B is a schematic structural diagram illustrating a feature extraction unit of an angle prediction model in an example according to an embodiment of the disclosure.

FIG. 7B is a schematic structural diagram illustrating a feature extraction unit of an angle prediction model in an example according to an embodiment of the disclosure.

Referring to FIG. 7B, it is a schematic structural diagram illustrating an optional basic unit (as shown by a dashed box) of lightweight feature extraction that may be deployed on a mobile terminal device according to an embodiment of the application. As shown, compared with the structure shown in FIG. 7A, some BN layers are removed from the lightweight feature extraction unit, thus the overall structure is concise. Experiments have proved that the structure of the lightweight feature extraction unit may make the network work normally in use. Therefore, the BN layer may be unnecessary in the deployment of the embodiment of the application, and the influences on overall performance of the network is not large. On the other hand, the usage of the BN layer comes at a cost. The usage of the BN layer increases the amount of calculation and memory usage, and reduces the portability and generality of network due to not all mobile platforms supportable for the BN layer. Therefore, the benefits of removing the BN layer from the lightweight basic unit are obvious, with not only reducing the amount of calculation, but also improving the network platform compatibility.

In an optional embodiment of the application, when the rotation angle corresponding to the image to be processed is determined according to the rotation angle of the object in the image to be processed, the rotation angle of the object in the image to be processed may be predicted by the following method.

Manner 2: skeleton keypoints of an object are detected by a posture estimation model, and the rotation angle of the object is predicted according to the skeleton keypoints of the object.

With respect to this manner, when the rotation angle corresponding to the image is determined based on the rotation angle of the object in the image, the rotation angle of the object may be obtained through the keypoints information detected by the posture estimation model.

It may be known from the foregoing description that the object in the image may include, but not limited to, a person, and may also be an animal or other object with skeleton keypoints. In practical application, which skeleton keypoints are specifically detected, and which keypoints are based on by the prediction of the rotation angle of the object may be configured according to actual needs and/or application scenarios. The same posture estimation model or different posture estimation models may be used for the detection of skeleton keypoints of different objects.

As an example, the following describes the skeleton keypoints of the object by taking the object being a person as an example. For a person, a human posture estimation model may be used to detect the skeleton keypoints of the human. The result of the human posture estimation may include, but is not limited to, a human skeleton composed of 17 human skeleton keypoints (hereinafter referred to as bone nodes) as shown in FIG. 8.

Figure 8:
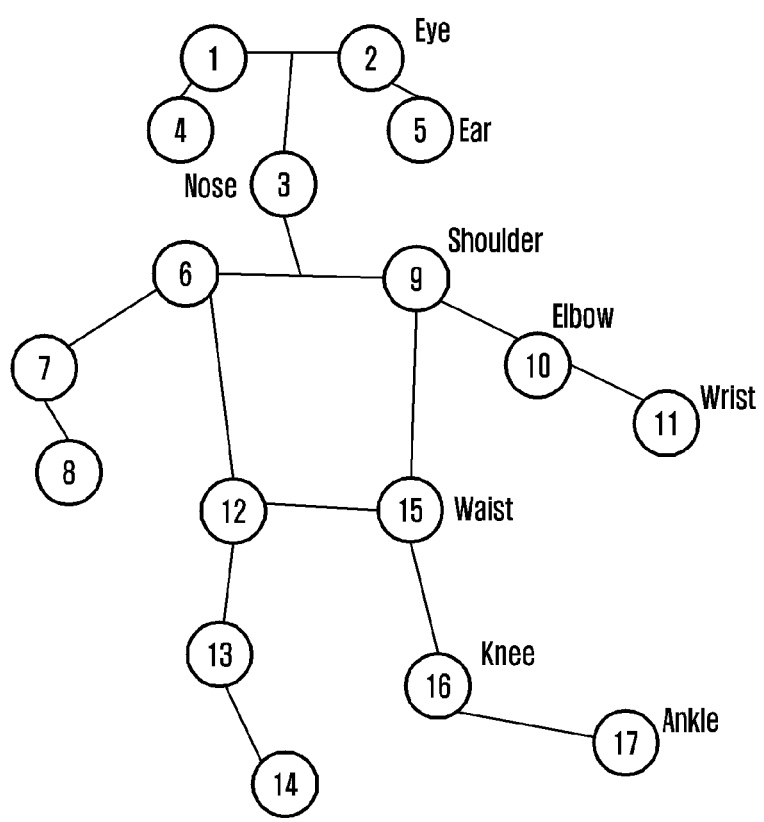
FIG. 8 is a schematic structural diagram illustrating a human skeleton structure in an example according to an embodiment of the disclosure.

FIG. 8 is a schematic structural diagram illustrating a human skeleton structure in an example according to an embodiment of the disclosure.

Referring to FIG. 8, for example, the human skeleton may also include human hip bone nodes. For convenience of description, each bone node is numbered in FIG. 8. In the following description, the corresponding bone node is represented by the number, as follows:

bone node 1 and bone node 2 are bone nodes of the eye part;
bone node 4 and bone node 5 are bone nodes of the ear part;
bone node 3 is a bone node of the nose part;
bone node 6 and bone node 9 are bone nodes of the shoulder part;
bone node 7 and bone node 10 are bone nodes of the elbow part;
bone node 8 and bone node 11 are bone nodes of the wrist part;
bone node 12 and bone node 15 are bone nodes of the waist part;
bone node 13 and bone node 16 are bone nodes of the knee part; and
bone node 14 and bone node 17 are bone nodes of the ankle part.

For convenience of description, hereinafter, the bone nodes with corresponding numbers may be represented by p1 to p17. For example, the bone node 6 is represented by p6.

Based on Manner 2, in this example, the rotation angle of the human body in the image may be predicted based on the above posture estimation result, i.e., the detected skeleton keypoints of the human. In the embodiment of the application, the specific method of the human posture estimation is not limited.

In an optional embodiment of the application, the predicting the rotation angle of the person according to the skeleton keypoints of the object may include:

predicting the rotation angle of the object, according to position relationship between at least two skeleton keypoints of the object.

Since two keypoints may constitute a line, the rotation angle of the object may be predicted based on at least two skeleton keypoints of the object. The position relationship of the at least two keypoints refers to a position relationship characterizing deviation angle of the object relative to central axis of the image (which may be a horizontal central axis or a vertical central axis). The specific position relationship may be configured according to actual needs. The embodiment of the application does not limit the specific form of the position relationship. For example, the position relationship may include, but is not limited to, a line between two keypoints. The deviation angle of the line from the central axis of the image may be used as the rotation angle of the object. When the skeleton keypoints of the object are at least three, the position relationship may also refer to the position relationship between the line of two keypoints and other keypoints.

In an optional embodiment of the application, the at least two keypoints include at least two corresponding keypoints.

The two corresponding keypoints may specifically refer to the two corresponding bone nodes on the left and right sides of the object respectively. For example, for a person, the two corresponding skeleton keypoints of the human body may refer to the corresponding skeleton keypoints on the left and right sides of the human body. As shown in FIG. 8, the bone node 6 and the bone node 9 on shoulder part, and the bone node 12 and the bone node 15 on waist part, are both the two corresponding keypoints.

Since when the object is relatively upright, the corresponding two skeleton keypoints of the object are generally symmetrical. Therefore, the rotation angle of the object may be predicted based on the position relationship between the corresponding keypoints of the object to improve accuracy of the prediction. As an optional manner, the description is continued with the example shown in FIG. 8.

Figure 9:
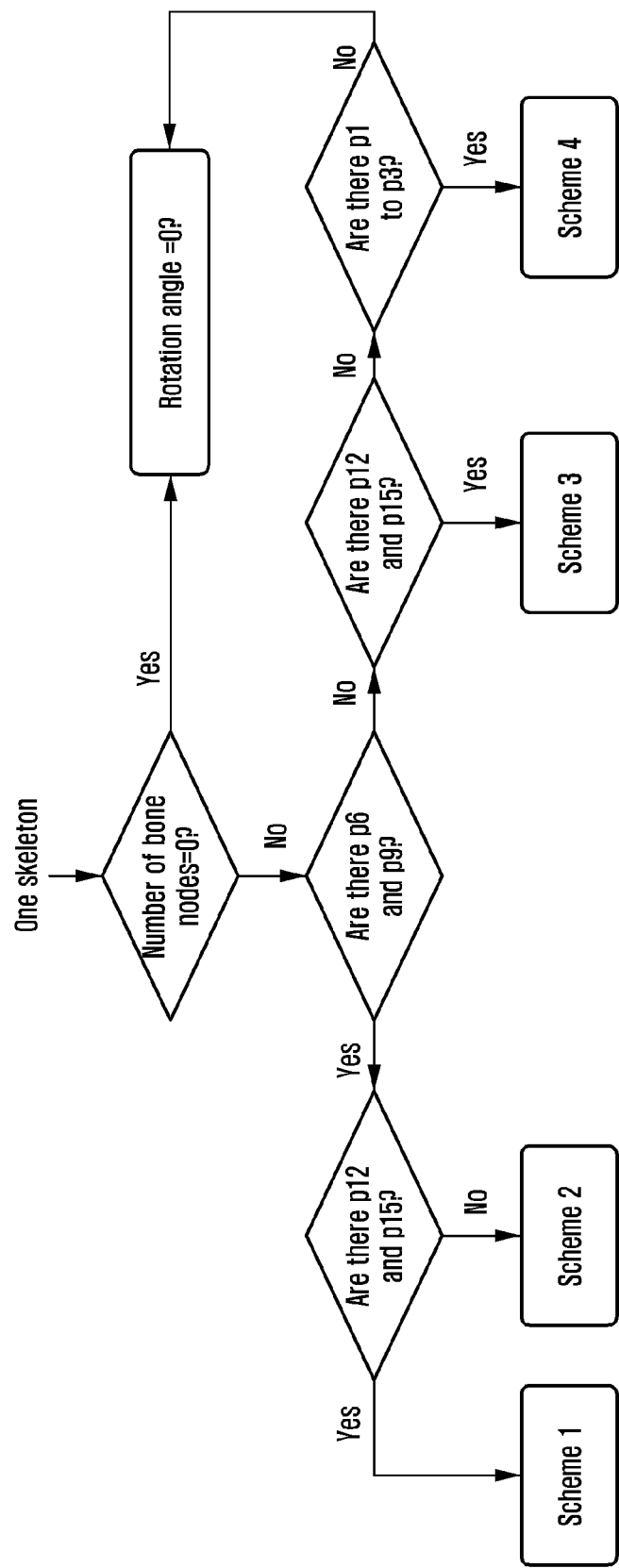
FIG. 9 is a schematic flowchart illustrating a process for predicting a person's rotation angle based on skeleton keypoints of a human in an example according to an embodiment of the disclosure.

FIG. 9 is a schematic flowchart illustrating a process for predicting a person's rotation angle based on skeleton keypoints of a human in an example according to an embodiment of the disclosure.

Referring to FIG. 9, it is a schematic flowchart illustrating predicting the rotation angle of the human body based on the skeleton keypoints of the human body shown in FIGS. 8. 10A, 10B, 10C and 10D are schematic diagrams illustrating four ways for calculating the rotation angle of the human body. Specifically, as shown in FIGS. 9, 10A, 10B, 10C, and 10D, the manner of predicting the rotation angle of the human body in this example may mainly include the followings.

(1) If the number of bone nodes is equal to 0, it may be considered that there is no person in the image, so the rotation angle of the image is 0; otherwise, the method proceeds to (2).

(2) Among the bone nodes of the human body, the bone nodes on the shoulder and waist may best reflect the posture of the human body. Therefore, this solution proposes that the bone nodes on the shoulder and waist may be detected in sequence firstly. If the bone node p6 and the bone node p9 are detected, the method proceeds to (3); otherwise the method proceeds to (6).

(3) If the bone node p12 and the bone node p15 are detected, the method proceeds to (4); otherwise, the method proceeds to (5).

FIGS. 10A, 10B, 10C, and 10D are schematic diagrams illustrating a principle of predicting a person's rotation angle based on skeleton keypoints of a human in an example according to various embodiments of the disclosure.

Figure 10A:
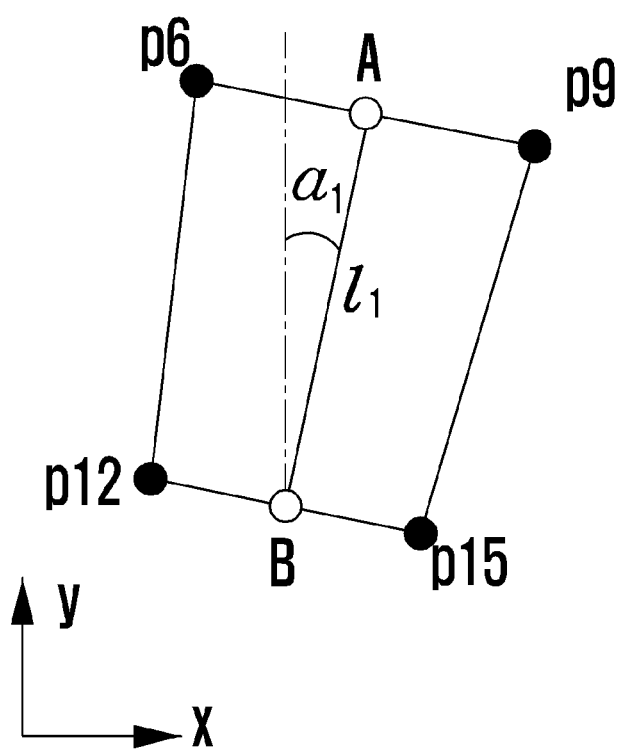
FIGS. 10A, 10B, 10C, and 10D are schematic diagrams illustrating a principle of predicting a person's rotation angle based on skeleton keypoints of a human in an example according to various embodiments of the disclosure.

(4) The rotation angle of the human body is calculated according to scheme 1. Referring to FIG. 10A, the two endpoints of line segment $l_1$ are the midpoint A of connection line between the bone node p6 and the bone node p9 and the midpoint B of connection line between the bone node 12 and the bone node 15, respectively. The angle $\alpha_1$ between $l_1$ and the y-axis (vertical central axis) of the image is calculated, which is the rotation angle of the portrait (the rotation angle of the human body).

Figure 10B:
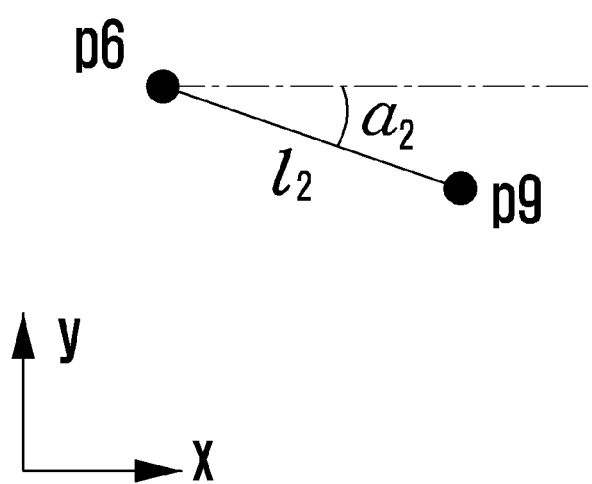

(5) The rotation angle of the human body is calculated according to scheme 2. Referring to FIG. 10B, the two endpoints of line segment $l_2$ are the bone node p6 and the bone node p9, respectively. The angle $\alpha_1$ between $l_2$ and the x-axis (transverse central axis, that is, horizontal central axis) of the image is calculated, which is the rotation angle of the portrait.

(6) If the bone node p12 and the bone node p15 are detected, the method proceeds to (7); otherwise, the method proceeds to (8).

Figure 10C:
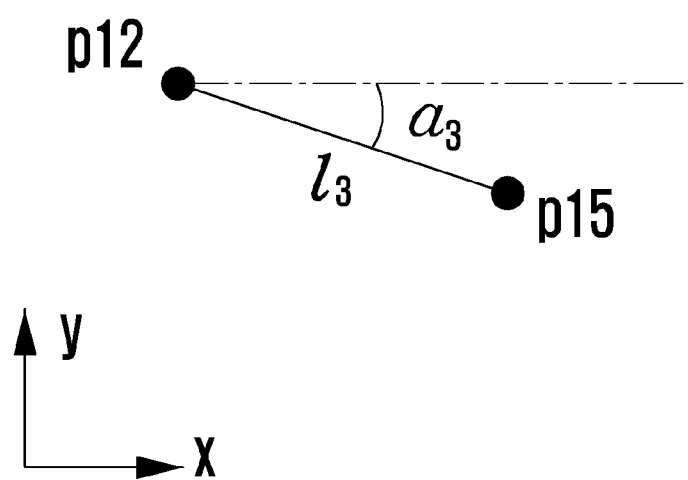

(7) The rotation angle of the human body is calculated according to scheme 3. Referring to FIG. 10C, the two endpoints of line segment $l_3$ are the bone node p12 and the bone node p15, respectively. The angle $\alpha_3$ between $l_3$ and the x-axis of the image is calculated, which is the rotation angle of the portrait.

(8) If the bone nodes p1 to p3 are detected, the method proceeds to (9); otherwise, the image rotation angle is considered to be 0.

Figure 10D:
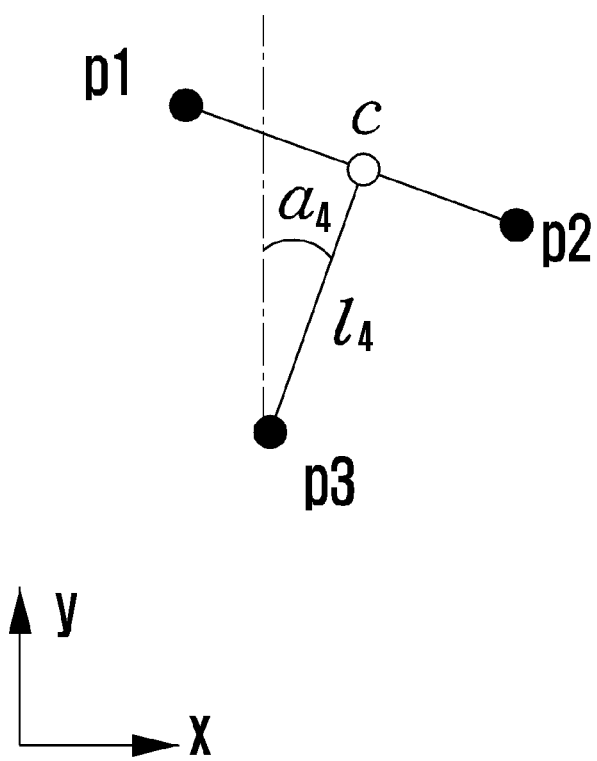

(9) The rotation angle of the human body is calculated according to scheme 4. Referring to FIG. 10D, the two endpoints of line segment 14 are the midpoint C of connection line between the bone node p1 and the bone node p2, and the bone node p3, respectively. The angle $\alpha_4$ between $l_4$ and the y-axis of the image is calculated, which is the rotation angle of the portrait.

It should be noted that the above-mentioned methods for predicting the rotation angle provided in the embodiments of the application may be used individually or simultaneously. For example, as an example, the rotation angle of the object in the image to be processed may be predicted by using Manner 1 and/or Manner 2, and the rotation angle corresponding to the image to be processed is determined based on the rotation angle of the object predicted by using Manner 1 and/or Manner 2. For example, the rotation angle corresponding to the image may be determined based on the rotation angle predicted by using one of the manner. Or, the rotation angles of objects predicted by using Manner 1 and Manner 2 may be fused, and the fused angle may be used as the rotation angle corresponding to the image. In addition, the rotation angle of the object may be predicted by using a different manner based on the object category in the image. For example, the rotation angle of the person in the image may be predicted by using Manner 2, the rotation angles of other objects in the image except the person may be predicted by using Manner 1, and the rotation angle corresponding to the image to be processed may be determined based on the prediction result obtained by using at least one manner. It may be understood that this example simply lists several optional solutions. In practical application, based on the above two manners provided in the embodiments of the application, the specific selected scheme may be determined according to actual needs or may be set by the user by providing setting options to the user.

In an optional embodiment of the application, the performing the rotation correction on the image to be processed according to the rotation angle may include: performing the rotation correction on the first object region, and the segmenting the corrected image to be processed may include: segmenting the corrected first object region; and obtaining a segmentation result of the object to be processed based on the segmentation result of the first object region.

When the proportion of the object (such as a person) in the image to be processed is small, if the target region is determined by image segmentation of the entire image, segmentation accuracy may be lower. Moreover, the amount of data to be processed is large and thus the processing efficiency may be lower when the entire image is segmented. To solve this problem, as an optional manner, when performing the rotation correction on the image to be processed, the entire image to be processed may be rotated. Or, only the object region in the original image may be rotated, the rotation corrected object region may be segmented, and the segmentation result of the original image is obtained based on the segmentation result of the rotation corrected object region. In this way, since the segmentation is not needed to be performed on the entire original image, the amount of data that needs to be processed may be reduced, and the image segmentation efficiency may be improved. And since the segmentation is performed on the rotation corrected object region, the accuracy of image segmentation may be ensured at the same time.

As an example, the image of the middle part as shown in FIG. 2 is the object region, the image rotation correction may be performed on only this region.

Figure 11:
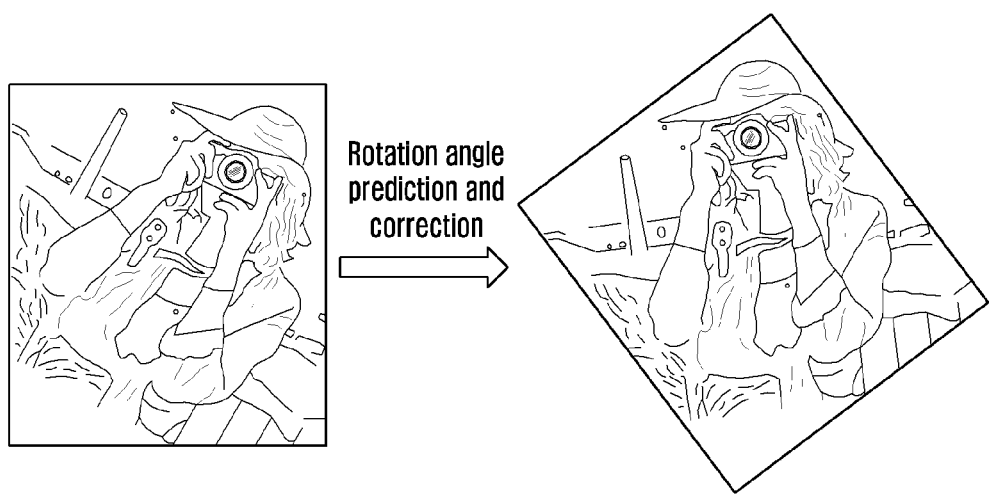
FIG. 11 is a schematic diagram illustrating a scheme for rotating an object region in an image to be processed based on a rotation angle in an example according to an embodiment of the disclosure.

FIG. 11 is a schematic diagram illustrating a scheme for rotating an object region in an image to be processed based on a rotation angle in an example according to an embodiment of the disclosure.

Referring to FIG. 11, the image of the rotation corrected region is obtained, and when the image segmentation is performed, only this rotated image may be segmented to obtain the segmented portrait and non-portrait part. The segmentation result is reversely rotated based on the predicted rotation angle, and the result of reverse rotation and the non-object region in the original image are merged to obtain the segmentation result of the original image.

In an optional embodiment of the application, the segmenting the image to be processed may include:

detecting second object regions where object are located in the image to be processed respectively, segmenting the second object regions respectively, or merging the second object regions to obtained a merged image and segmenting the merged image, and obtaining segmentation result of the image to be processed based on segmentation results of the second object regions.

It should be noted that the image to be processed in this solution may be an image without being rotation corrected or a rotation corrected image. The second object region in this solution may be the same as or different from the first object region described above. The first object region is an object region used to determine the rotation angle corresponding to the object to be processed when performing the rotation correction on the object to be processed, wherein the rotation angle corresponding to the first object region is determined as the rotation angle corresponding to the object to be processed, and when performing the rotation correction, the image to be processed or the first object region may be corrected based on the rotation angle to obtain a corrected image. The second object region is an object region in the determined image to be segmented when performing segmentation on the image to be processed and the rotation corrected image, wherein when the image is segmented, the second object region in the image may be segmented, or the merged image may be segmented after merging each second object region.

In addition, in practical application, when the rotation correction is performed on the image based on the rotation angle corresponding to the first object region, with respect to the segmentation of the image to be processed, it may be performed in the manner of detecting each second object region and performing the segmentation based on the second object region in this solution, or it may also be performed in the manner of segmenting the corrected first object region and obtaining the segmentation result of the object to be processed based on the segmentation result of the first object region described foregoing.

Optionally, the segmenting the second object region may specifically include: enlarging or shrinking the second object region, and segmenting the enlarged or shrunk second object region.

Optionally, the merging the second object regions and segmenting the merged image may specifically include: merging the second object regions, enlarging or shrinking the merged image, and segmenting the enlarged or shrunk merged image.

When segmenting the image to be processed or the rotation corrected image to be processed, in order to improve the segmentation accuracy, the object region of the image to be processed or the corrected image to be processed may be detected firstly, and the detected object regions may be segmented, thereby reducing the amount of data to be processed and improving the segmentation accuracy.

As an optional solution, in order to further improve the segmentation accuracy of the image, after the rotation correction of the image is completed, the object region, i.e., the second object region, in the corrected image is detected. That is, after the correction of the image is completed, the object region in the corrected image is detected again. Since the detection is based on the corrected image, the detected object region is more accurate. The accuracy segmentation is implemented by segmenting the re-detected object region, and the amount of data that needs to be processed may also be reduced.

When the second object region is detected, each second object region may be segmented to obtain the segmentation result of each second object region. In addition, when there are multiple second object regions, in order to improve the segmentation efficiency and to avoid the impact on the segmentation speed caused by the separate segmentation on each second object region, the multiple second object regions may be merged into one image firstly, and then the merged image is segmented to improve the segmentation speed. In addition, in order to improve the segmentation accuracy, when segmenting the image to be segmented (each second object region or the merged image), the following two solutions may be used. In order to ensure the segmentation accuracy when the image to be segmented or the object region in the image to be segmented is small, the image enlarging processing may be firstly performed on the image to be segmented and then the enlarged image is segmented. Correspondingly, after the segmentation is completed, the corresponding image shrinking processing may be performed on the segmentation result to obtain the segmentation result of the image to be segmented. In order to ensure segmentation efficiency when the image to be segmented or the object region in the image to be segmented is large, the image shrinking processing may be firstly performed on the image to be segmented and then the shrunk image is segmented. Similarly, after the segmentation is completed, the corresponding image enlarging processing may be performed on the segmentation result to obtain the segmentation result of the image to be segmented.

In addition, based on the solutions provided by the embodiment of the application, in addition to improving the accuracy and speed of segmentation, a processing method that detects the category of each object is firstly used, which may filter out object of irrelevant category in the image. Therefore, compared with directly using of segmentation processing, the addition of this detection processing may reduce error probability of including the object of irrelevant category in the segmentation result, and improve the performance of segmentation so that higher segmentation accuracy transforms into better style transfer quality.

Figure 12:
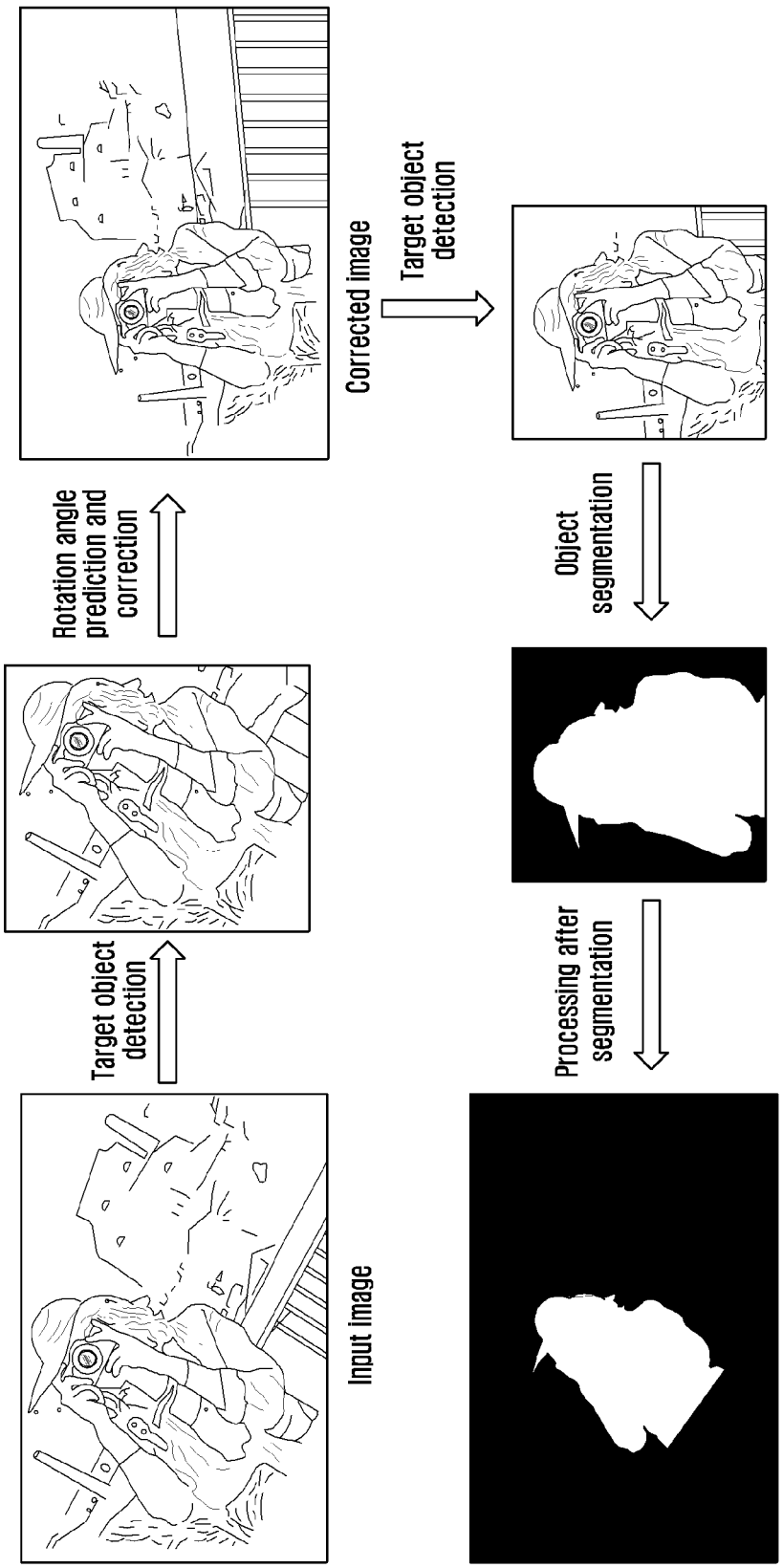
FIG. 12 is a schematic flowchart illustrating a scheme for performing rotation correction and image segmentation on an image to be processed in an example according to an embodiment of the disclosure.

FIG. 12 is a schematic flowchart illustrating a scheme for performing rotation correction and image segmentation on an image to be processed in an example according to an embodiment of the disclosure.

Referring to FIG. 12, before the object to be processed is segmented through the object segmentation model, a detection module (target object detection) and an object rotation angle prediction and correction module may be added before the object segmentation model. The detection module may detect the region of the object (that is, the first object region) in the input image, that is, the middle image on the upper part. The object rotation angle prediction and correction module predicts the rotation angle of the object in the region, and performs the rotation correction on the input image based on the rotation angle to obtain a corrected image, and then detects the object position in the corrected image again to obtain the object region (i.e., the second object region) here, which is the rightmost image in the three images on the lower part of the FIG. 12 in this example. It may be seen from the two detection results, the object region detected based on the rotation corrected image has significantly higher accuracy compared with the object region detected based on the original image. A more accurate object segmentation result (the middle image in the three images on the lower part) may be obtained by using the second object region as an input image of the object segmentation model, and then process it to generate the object segmentation result of the original image for subsequent processing of the image. Specifically, the accurately segmented image may be rotated reversely according to the rotation angle, the rotated reversely image is fused with the image region in the original image except this region to obtain the accurate segmentation result of the original image, that is, the leftmost image in the three images on the lower part.

Specifically, after detecting the first object region and predicting the rotation angle α corresponding to the object region, the first object region may be specifically cropped and rotated based on the following transformation matrix to obtain the middle image on the upper part of FIG. 12 from the input image.

$$M = RT \quad \text{Equation 1}$$

$$R = \begin{bmatrix} \cos\alpha & \sin\alpha & 0 \\ -\sin\alpha & \cos\alpha & 0 \\ 0 & 0 & 1 \end{bmatrix}, T = \begin{bmatrix} sx & 0 & 0 \\ 0 & sy & 0 \\ dx & dy & 1 \end{bmatrix}$$

Wherein, R is a rotation correction matrix, T is a cropping matrix, dx and dy are position information of the object region in the image to be processed (usually the horizontal and vertical coordinate values of the upper-left coordinate point of the object region), respectively, and sx and sy represent scaling ratios of the object region when the object region are cropped, respectively. For example, if width and height of the object region in the image to be processed are w and h respectively, and width and height of the obtained cropped object region are W and H respectively, sx=w/W, and sy=h/H. It may be understood that if no shrink or enlargement is performed, w=W, and h=H.

It may be known from the foregoing description that, as another optional manner, when performing segmentation on the image to be processed, the image segmentation may also be performed based on an image that is not rotation corrected. As shown in the example shown in FIG. 12, after detecting the object region in the input image (the middle image on the upper part) by the detection module, the object region may be directly segmented to obtain the object segmentation result, and the object segmentation result is fused with the image region in the original image except this region to obtain the segmentation result of the original image.

In an optional embodiment of the application, the second object region is an object region that meets a preset condition in the image to be processed or the corrected image to be processed.

Similarly to the principle of the first object region being an object region that meets the preset condition described in the above, the second object region may also be an object region that meets the preset condition in the image to be processed or the rotation corrected image, to reduce the amount of data to be processed and improve data processing efficiency.

It may be understood that the above preset condition corresponding to the first object region may be the same as or different with the preset condition here corresponding to the second object region, both of which may be configured and adjusted according to actual application requirement.

In addition, when the image contains multiple objects that meet the preset condition, that is, when there are multiple second object regions, as an optional manner, the regions of all objects may be combined for subsequent processing to avoid the reducing of speed due to the segmentation processing on the multiple object regions separately.

Figure 13A:
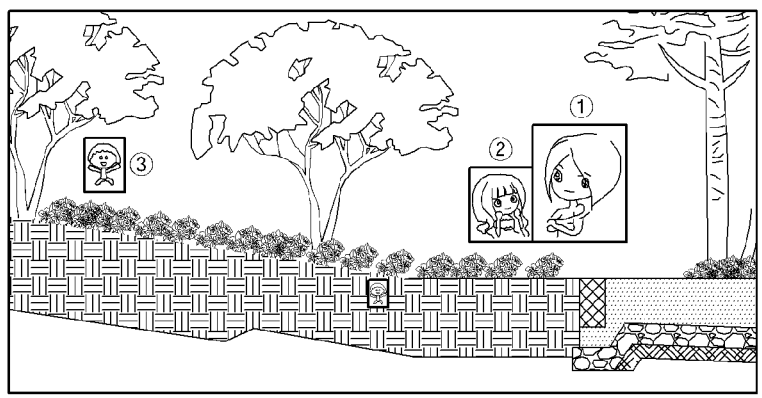
FIGS. 13A, 13B, and 13C are schematic diagrams illustrating a scheme for filtering and merging regions of multiple persons in an image in an example according to various embodiments of the disclosure.
Figure 13B:
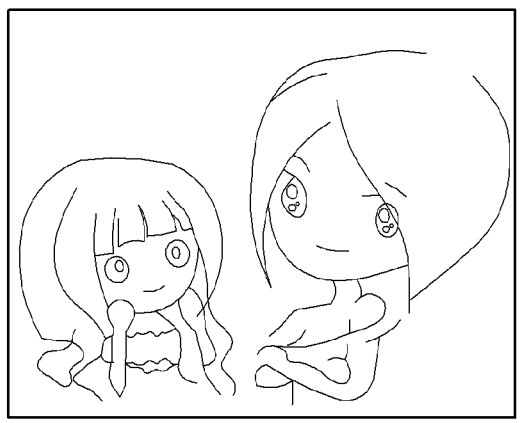
Figure 13C:
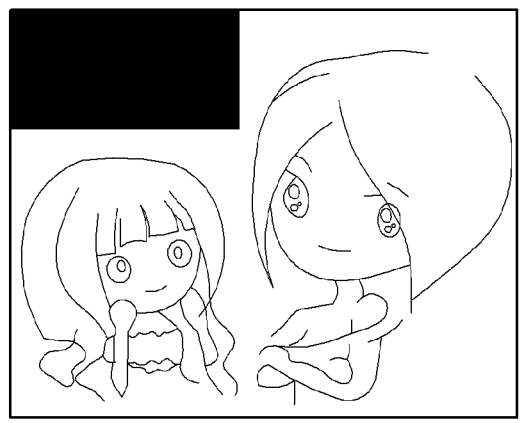

FIGS. 13A, 13B, and 13C are schematic diagrams illustrating a scheme for filtering and merging regions of multiple persons in an image in an example according to various embodiments of the disclosure.

Referring to FIGS. 13A, 13B, and 13C, an image to be processed or a rotation corrected image is shown. For this image, the image detection model detects the second object region, and output the result of 3 object regions, that is, the object regions ①, ②, and ③. Among those regions, the object regions ① and ② meet the preset condition, and the object region 3 does not meet the preset condition so it is ignored. During segmentation on the detected object regions ① and ②, the object regions ① and ② may be merged firstly as input image for subsequent segmentation processing. The manner of merging is not limited in the embodiment of the application, which may be configured according to actual requirement. For example, the manner of merging of simply using the image region corresponding to the maximum bounding box of multiple objects (as shown in FIG. 13B) as the input of the subsequent segmentation processing may be used. Alternatively, the manner of merging of using an image by putting multiple object regions together as the input of the subsequent segmentation processing (shown in FIG. 13C) may be used.

The specific manner of detecting the object region (the first object region and/or the second object region) in the image is not limited in the embodiments of the application, which may be configured according to actual requirement. For example, as an optional solution, the object detection may be performed by using the method based on You Only Look Once (YOLO) or Single Shot MultiBox Detector (SSD) or the like. These detection models have a small storage capacity and a fast running speed, which are suitable for being deployment on a mobile terminal device.

Compared with the existing solution of directly performing the image segmentation on the original object to be processed, the solution of firstly detecting object region in the image to be processed or the rotation corrected image to be processed then segmenting the object region separately or segmenting the merged object region after merging the object regions provided in the embodiments of the application, may effectively improve the accuracy of image segmentation. In order to better explain this effect, a specific example will be described below.

Figure 13D:
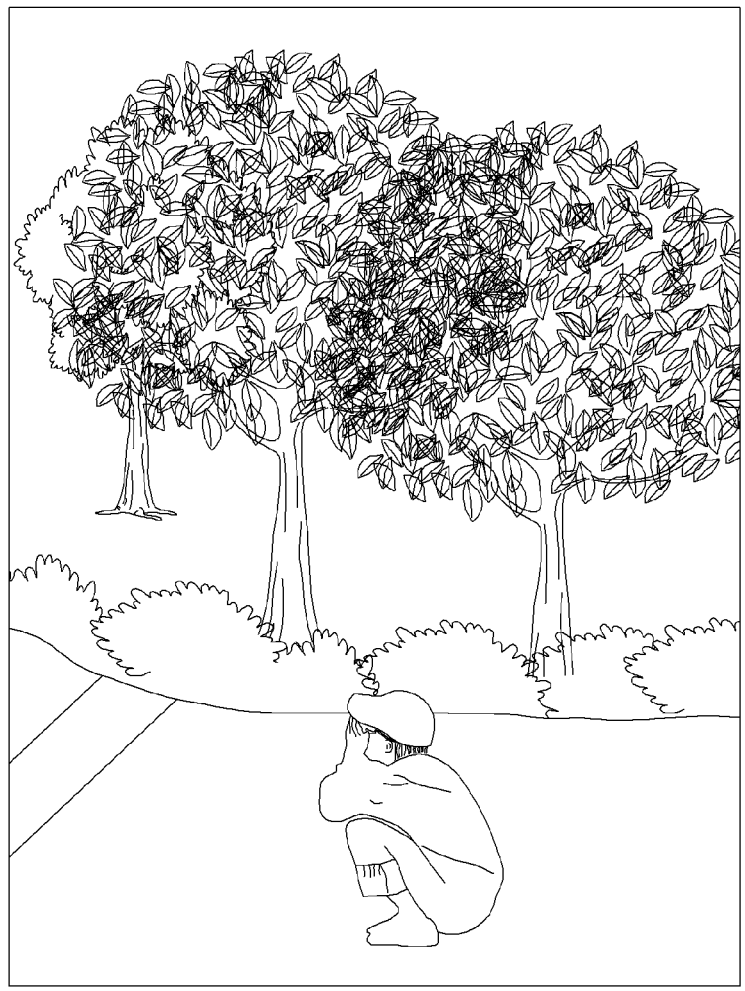
FIG. 13D is a schematic diagram of an image to be processed in an example according to an embodiment of the disclosure.

FIG. 13D is a schematic diagram illustrating an image to be processed in an example according to an embodiment of the disclosure, where the object is the person.

Figure 13E:
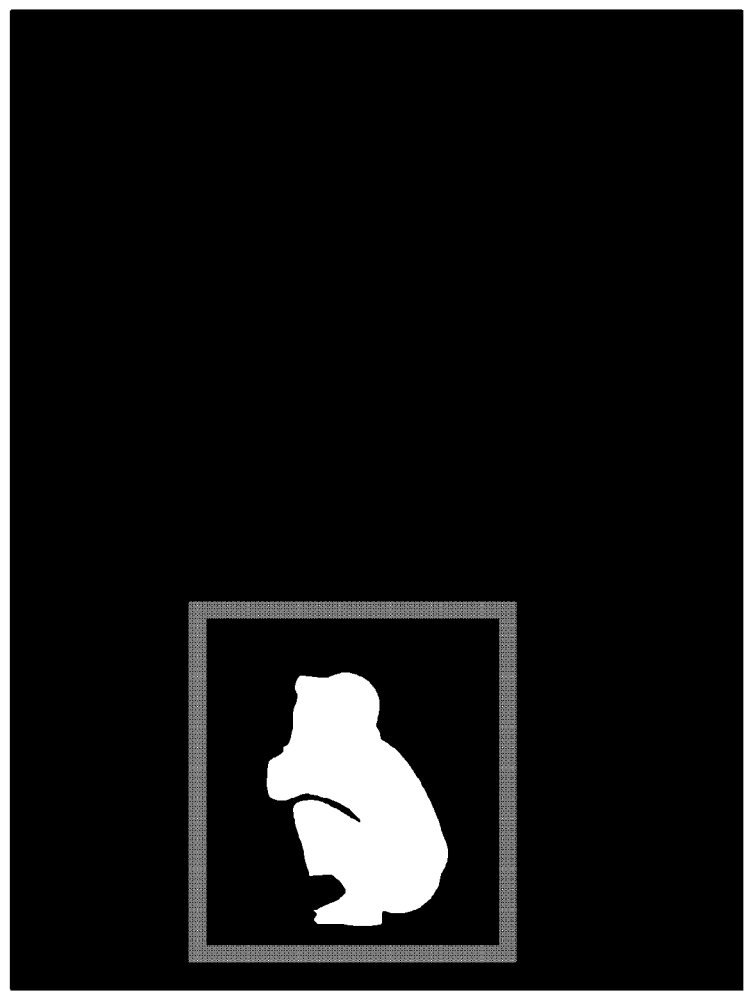
FIG. 13E is a schematic diagram of an object segmentation result of segmenting an image to be processed shown in FIG. 13D using an existing solution according to an embodiment of the disclosure.

FIG. 13E shows a schematic diagram after the image segmentation is performed on the image in FIG. 13D by using an existing image segmentation method according to an embodiment of the disclosure.

Figure 13F:
FIG. 13F is an enlarged view of FIG. 13E according to an embodiment of the disclosure.

FIG. 13F is an enlarged view of the portion of the person object in FIG. 13E according to an embodiment of the disclosure.

Figure 13G:
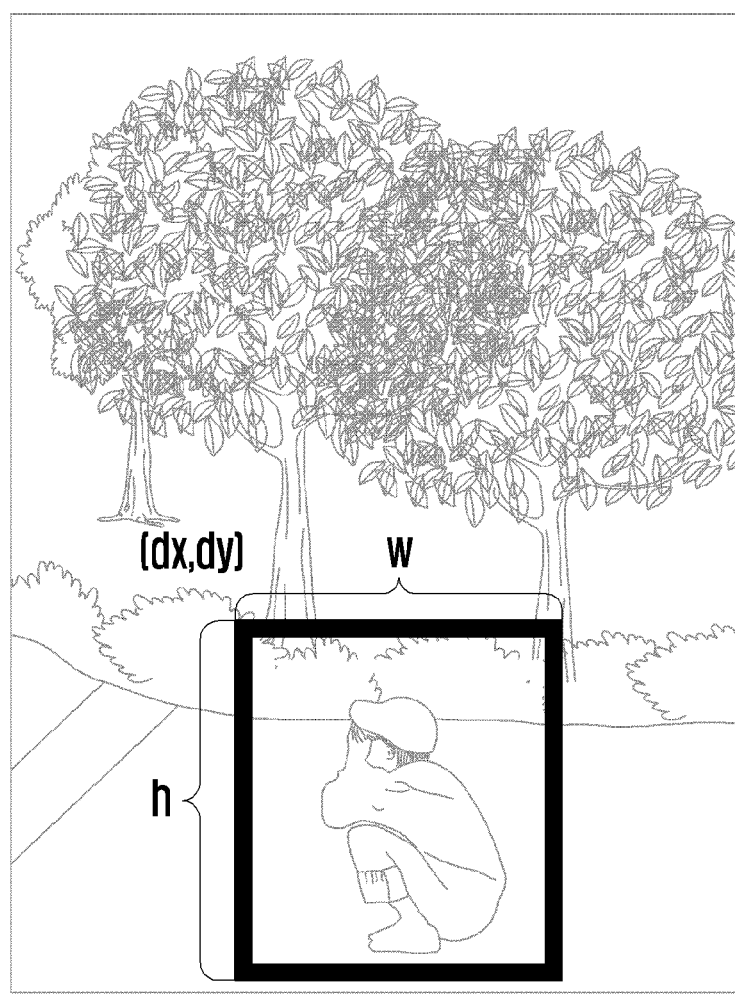
FIG. 13G is a schematic diagram of a detection result of performing object detection on an image to be processed in FIG. 13D based on a solution provided in according to an embodiment of the disclosure.

FIG. 13G is a schematic diagram of a detection result of performing object detection on an image to be processed in FIG. 13D based on a solution provided in according to an embodiment of the disclosure.

Figure 13H:
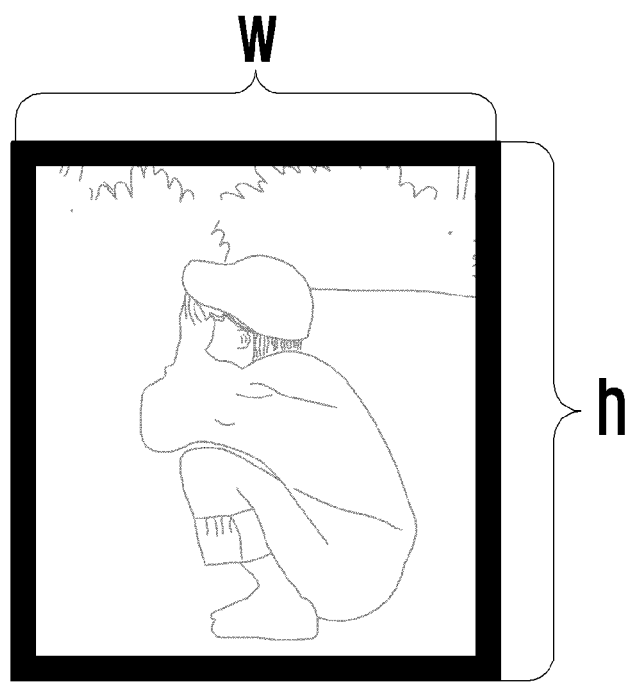
FIG. 13H is an image of an object region after cropping the object detection result in FIG. 13G according to an embodiment of the disclosure.

FIG. 13H is an image of an object region after cropping the object detection result in FIG. 13G according to an embodiment of the disclosure.

Figure 13I:
FIG. 13I is a schematic diagram of an object segmentation result of the image shown in FIG. 13H according to an embodiment of the disclosure.

FIG. 13I is a schematic diagram of an object segmentation result of the image shown in FIG. 13H according to an embodiment of the disclosure.

As can be seen from FIGS. 13E and 13F, the segmentation accuracy of the obtained image segmentation result is low and the edge segmentation effect of the object is blurred by using the existing image segmentation method.

Referring to FIGS. 13D-13I, for the object to be processed shown in FIG. 13D, the object region in the image may be detected by the image detection model (such as YOLO, or SSD detection model). As shown in the object region detection result shown in FIG. 13G, dx and dy respectively represent coordinate values of the coordinate point on the upper left corner of the bounding box of the object region in the image to be processed, where the coordinate origin is usually the coordinate point on the lower left corner of the image to be processed, and w and h represent the width and height of the bounding box respectively, that is the width and height of the detected object region. After detecting the object region, the image to be processed may be cropped according to the position information (including dx, dy, w, and h) of the detected object region to obtain the image of object region, as shown in FIG. 13H. Then the object region may be segmented to obtain the segmentation result shown in FIG. 13I. By comparing FIG. 13I and FIG. 13F, it may be seen that the solution based on the embodiment of the application effectively improves the image segmentation accuracy. Specifically, when the image of the object region is obtained by cropping the image to be processed, the following formula may be used:

$$[x'\ y'\ 1] = [x\ y\ 1] \begin{bmatrix} sx & 0 & 0 \\ 0 & sy & 0 \\ dx & dy & 1 \end{bmatrix} \quad \text{Equation 2}$$

Where, x and y respectively represent the coordinate values of the image coordinate point of the object region in the image to be processed, that is, the coordinate values of the coordinate point of the object region shown in FIG. 13G; x' and y' are the coordinate values of the corresponding coordinate point of the object region in the cropped image, that is, the coordinate values of the coordinate point in FIG. 13H corresponding to the object region in FIG. 13H; and sx and sy are image scaling ratios, specifically, sx=w/W, and sy=h/H, where W and H represent the width and height of the scaled image, that is, the width and height of the image of the object region obtained after cropping as shown in FIG. 13H.

In an optional embodiment of the application, the segmenting the image to be processed may include:
segmenting the image to be processed through the object segmentation model,
Wherein, the object segmentation model is obtained by training a neural network.

In addition, the object segmentation model may be a model for segmenting an input image based on a category of an object in the input image.

In the prior art, an edge extraction method is mostly used when determining the region of the object. However, the edge extraction method may not distinguish the object category, that is, may not distinguish whether the object in the image is a person or an animal, etc. Therefore, when performing an image style transfer, it is not possible to flexibly select the category of a target object. In addition, if there is an overlapping region between two or more objects in the image, it may not accurately extract the regions of the two or more objects by using the edge extraction method. Therefore, the accuracy and flexibility of determining the object region in the prior art are low, resulting in an unsatisfactory image segmentation result.

In view of this problem, in an optional embodiment of the application, when determining the region of the object, a method of object segmentation based on a neural network may be used. This method may not only achieve segmentation based on different object categories, but also accurately segment the target objects when there is an overlapping region between objects, to improve the accuracy or flexibility of determining the object region.

In an optional embodiment of the application, the target region may include a region where an object of a specified category is located in the image to be processed.

Since the object segmentation model provided in the embodiment of the application may implement image segmentation based on object category, in actual application, the style transfer may be performed on the region where an object of one or some specified categories is located in the image according to actual needs. The specified category may be a category pre-configured by the system, or a category specified by a user according to actual needs.

In an optional embodiment of the application, the method may further include:

receiving a style transfer request including the specified category of object that needs to be stylized. That is, the style transfer request may carry information on the category of the object, which is the specific category. That is, the user designates the object of this category as the image to be stylized. The region where the object is located in the image to be processed is the target region.

That is, when performing the style transfer on an image, the user may flexibly select the category of object that needs to be stylized according to the actual needs, which better meets needs of users. Of course, it may be understood that, in practical application, if the region in the image that needs to be stylized is a region that does not include the region where an object of one or some specified categories is located, the style transfer request may also include the information on the specified category of the object. The specified category here is the category of the object that does not need to be stylized.

In an optional embodiment of the application, the object segmentation model includes a PSPNet (Pyramid Scene Parsing Network), where the number of layers in the pyramid pooling module in the PSPNet is less than a set number. Therefore, the number of layers of the pyramid pooling module may be reduced, and the lightweight of the model may be achieved.

In order to make the object segmentation model better apply to more kind of terminal devices and run normally on a mobile terminal device, the object segmentation model used in the embodiment of the application is improved based on the original PSPNet. By reducing the number of layers of the pyramid pooling module in the existing PSPNet, the lightweight of the model may be achieved under the premise of ensuring segmentation accuracy, so that the model may be well applied to the mobile terminal device.

Figure 14A:
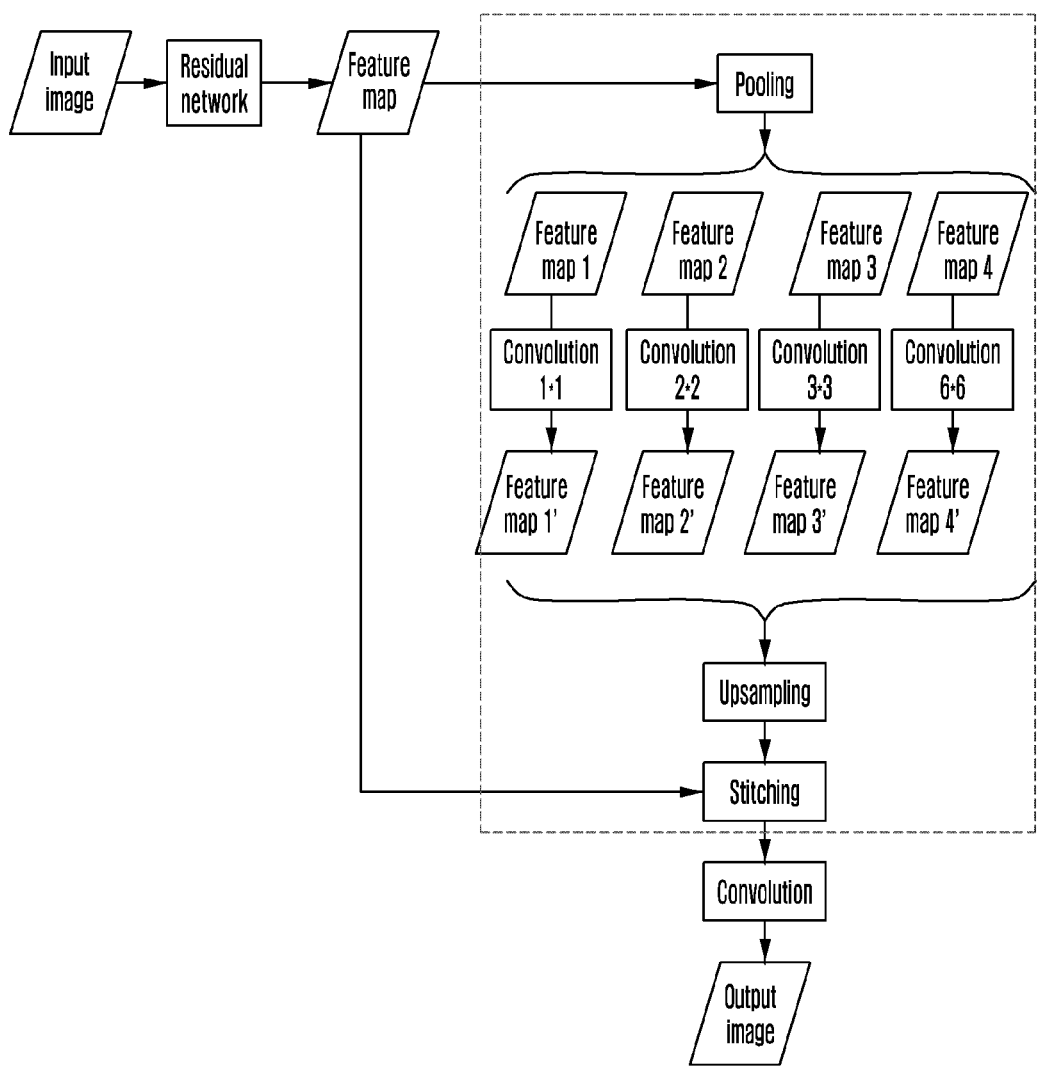
FIG. 14A is a schematic structural diagram illustrating a pyramid scene parsing network according to the related art.

The original PSPNet provides a priori structure of the global context, that is, the pyramid pooling module, which gives the network structure a hierarchical global priority and contains information on different sizes of different sub-regions, to get a more accurate segmentation result. As shown in FIG. 14A, in the original PSPNet, for the image to be processed (the input image), a feature extraction network (such as the residual network) is firstly used to obtain the feature map of the input image. The feature map is used as the input of the pyramid pooling module. This module fuses features with 4 different pyramid scales. The feature map is pooled at 4 different scales to obtain 4 feature maps, that is, the feature maps 1 to 4. In order to control the proportion of global features, the results of pooling are respectively processed by the corresponding convolution layers to reduce the dimensions of the feature maps 1 to 4 to obtain the reduced-dimension feature maps 1' to 4'. The feature maps 1' to 4' with low-dimension are up-sampled, and the up-sampled feature maps are connected to (which also may be called stitching) the feature map, which is the input of the pyramid pooling module, to get the final feature map. The final feature map is input to the convolution layer to get the final image segmentation result, that is, the output image.

In order to make the model better apply to the terminal devices, as an optional solution, in the object segmentation model used in the embodiment of the application, the third layer in the pyramid pooling module may be removed (that is, the operation on the feature map 3), to obtain information on three different pyramid scales. After removing this layer, the multi-scale information on the PSPNet is also retained to ensure the segmentation accuracy, and simultaneously the network structure is reduced to make the model run faster on the terminal, so that it may run on more types of terminal devices including a mobile terminal device. In the above example, the set number of layers may be 4, that is, the number of layers in the pyramid pooling module is less than 4.

FIG. 14A is a schematic structural diagram illustrating a pyramid scene parsing network according to the related art.

Figure 14B:
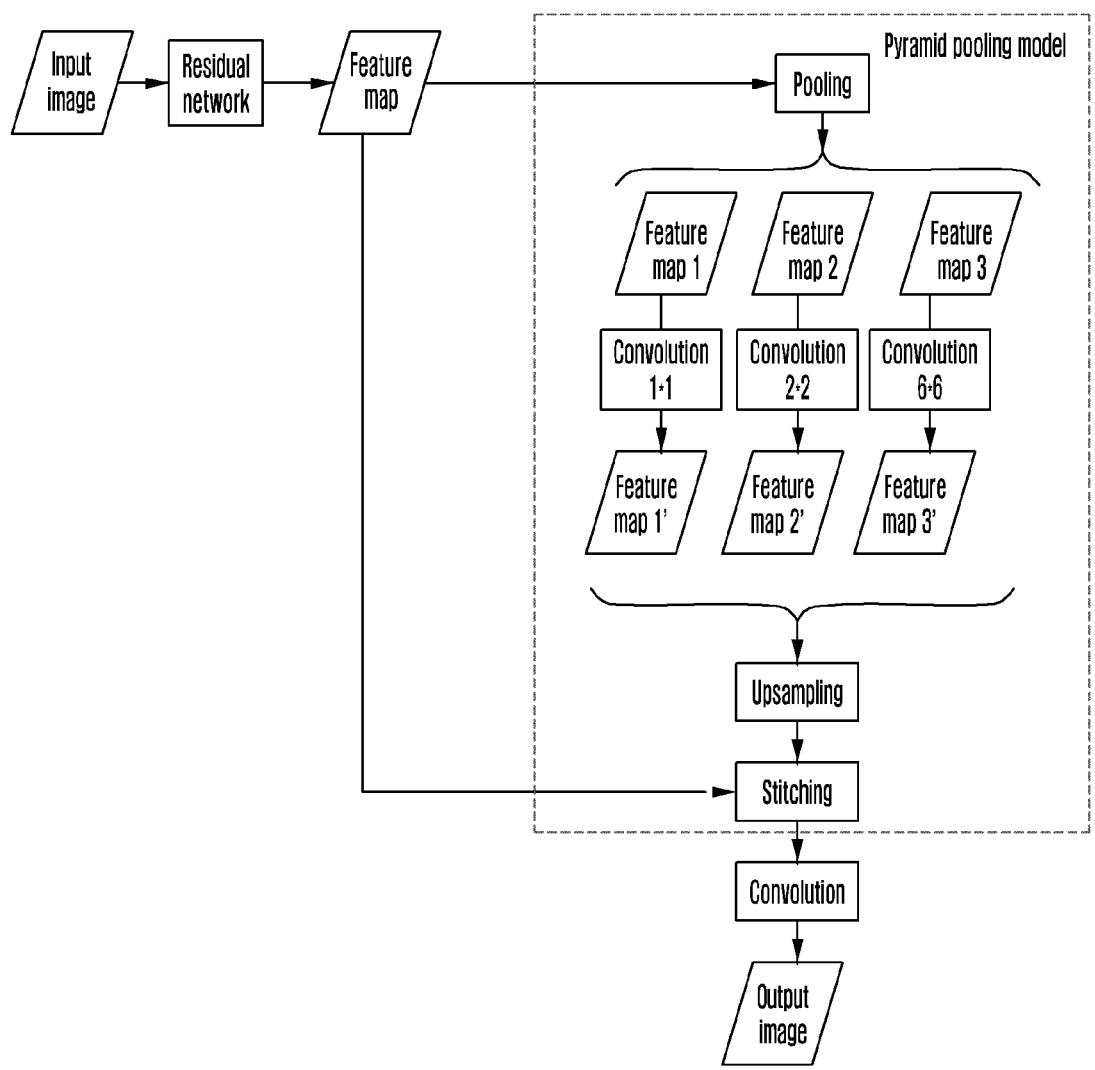
FIG. 14B is a schematic structural diagram illustrating an improved pyramid scene parsing network according to an embodiment of the disclosure.

FIG. 14B is a schematic structural diagram illustrating an improved pyramid scene parsing network according to an embodiment of the disclosure.

Referring to FIG. 14B, it is a schematic structural diagram illustrating an improved pyramid scene parsing network according to an embodiment of the application.

Referring to FIG. 14A, compared with FIG. 14A, the third layer of the pyramid model is removed from the model, that is, the convolution kernel is a 3*3 layer. Based on this model, features with three different pyramid scales may be obtained. On the premise of maintaining the multi-scale features of the pyramid, parameters of one scale are reduced, which not only guarantees accuracy but also reduces the run time of the model.

In an optional embodiment of the application, the performing style transfer on the target region may include:

performing an image style transfer on the target region through a style transfer model, wherein the style transfer model includes a generative adversarial network (GAN). A network structure of a generator in the GAN satisfies any of the following conditions:

including a convolution layer, a residual network (also referred as a residual connection block), and a deconvolution layer cascaded sequentially, including a convolution layer and a deconvolution layer cascaded sequentially, including a convolution layer, a depth-wise convolution layer, and a deconvolution layer cascaded sequentially; and including a convolution layer, a depth-wise convolution layer, a residual network and a deconvolution layer cascaded sequentially, and the number of channels in at least one convolution layer being less than a set number.

Compared with the existing network structure, the network structure of the GAN generator provided in the embodiment of the application may realize the lightweight of the network structure by reducing the number of channels in the at least one convolution layer in the network structure to reduce the amount of parameters in the network structure. The consistency of the image sizes between the input image and the output image of the network structure may be ensured by adding a deconvolution layer into the network structure. In another way, at least one of the residual network and the depth-wise convolution layer may be used to replace some of the convolution layers to further improve the image processing effect and reduce the amount of parameters. For detailed description of the effect of the network structure of the generator provided in the embodiments of the application, please refer to the further description in the examples below.

The GAN is a training method commonly used in the field of image generation, which has achieved good results in applications such as face generation, face attribute edition, and image coloring. Therefore, as an optional manner, the style transfer of the target region may be realized based on the style transfer model including the GAN.

For the style transfer task, the GAN needs to train the samples paired between before and after the style transfer of each content image, so other method needs to be used to generate the corresponding style transfer image ground truth for each training content image. As an optional manner, a slow style transfer method based on a Markov random field may be used to generate the style transfer image ground truth.

Figure 15:
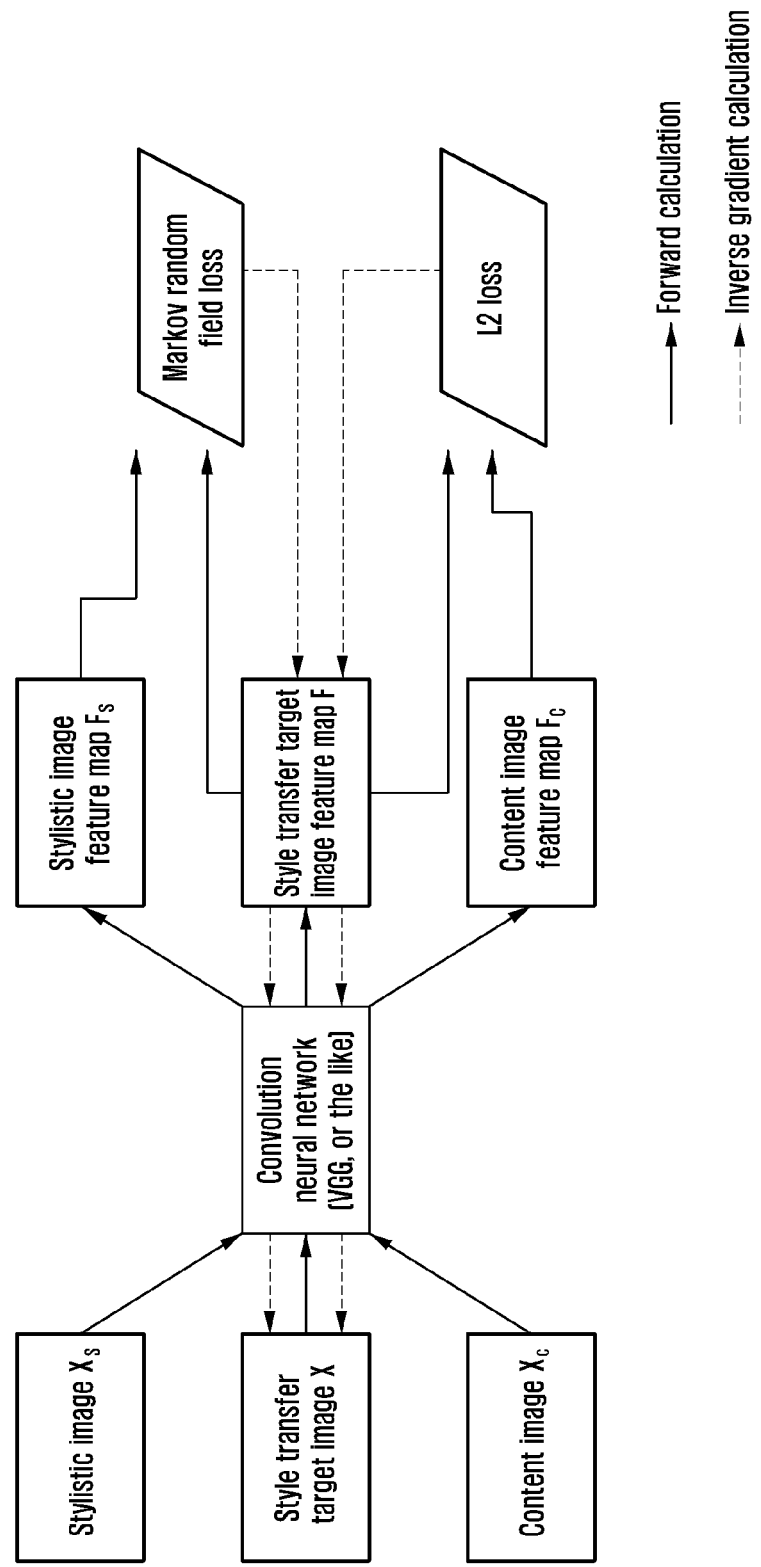
FIG. 15 is a schematic flowchart illustrating a scheme for generating a style transfer image ground truth using a Markov random field-based style transfer method in an example according to an embodiment of the disclosure.

FIG. 15 is a schematic flowchart illustrating a scheme for generating a style transfer image ground truth using a Markov random field-based style transfer method in an example according to an embodiment of the disclosure.

Referring to FIG. 15, it is a schematic flowchart illustrating a scheme for generating the style transfer image ground truth by using the Markov random field-based style transfer method. For a given content image $X_C$ and stylistic image $X_S$, our purpose is to generate an image X (that is, style transfer target image) having a style similar to $X_S$ and the same content as $X_C$, that is, the content image $X_C$ is transferred to an image X with the same style as $X_S$. X may be initialized with random noise. In each subsequent iteration, X, $X_C$, and $X_S$ are input into a convolutional neural network with fixed parameters to obtain several layers of feature map F (that is, the style transfer target image feature map), $F_C$ (that is, the content image feature map), and $F_S$ (that is, the stylistic image feature map), where the neural network may be selected according to actual needs, which may include, but is not limited to, neural network structures such as VGG (Visual Geometry Group), and AlexNet, and the like. Markov random field loss between F and $F_S$ and L2 loss (that is, mean square error loss) between F and $F_C$ are calculated. The two losses are weighted and transferred back to X to update X, which is a reverse Gradient calculation. The Markov random field loss pays more attention to local information, and the L2 loss pays more attention to global information. When the weighted loss changes tend to converge, iterating is stopped. At this time, X should have the same content as $X_C$ and have a similar style to $X_S$. At this time, X is the ground truth of $X_C$. All the training content images may be used to generate style transfer image ground truth in this method for GAN's adversarial generative training.

Figure 16:
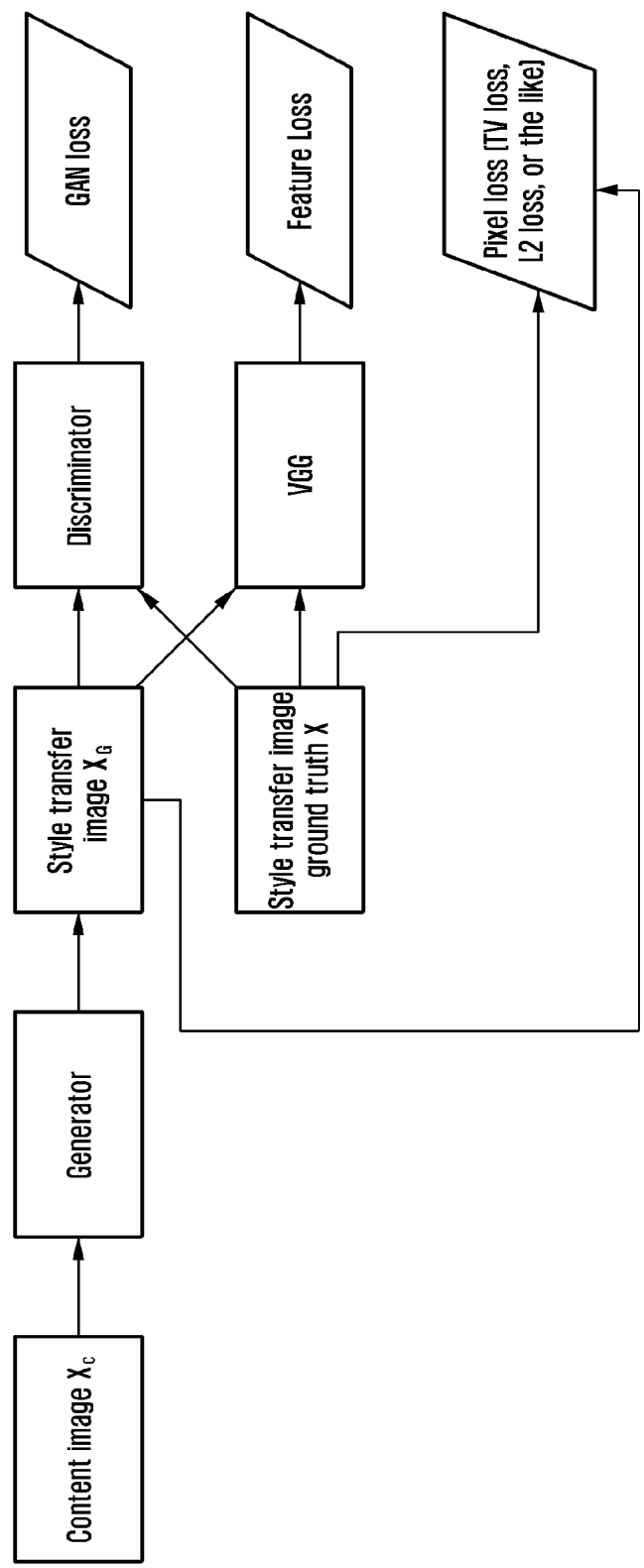
FIG. 16 is a schematic diagram illustrating a generative adversarial network in an example according to an embodiment of the disclosure.

FIG. 16 is a schematic diagram illustrating a generative adversarial network in an example according to an embodiment of the disclosure.

Referring to FIG. 16, it is a schematic diagram illustrating network structure of a GAN. In the GAN, the generator is in charge of image style transfer and confusing a discriminator. The content image $X_C$ is input into the generator, the generator generates the style transfer image $X_G$, and the discriminator is in charge of determining whether the generated image is generated by the current model or the style transfer image ground truth, that is, determining whether the image $X_G$ generated by the generator is the style transfer image ground truth of the content image $X_C$. The generator loss includes GAN loss, feature loss and pixel loss. The GAN loss refers to a cross-entropy loss output by the discriminator after the style transfer image $X_G$ output by the current generator and the style transfer image ground truth X being input into the discriminator. The feature loss refers to the L2 loss of feature maps of $X_G$ and X in a certain layer after $X_G$ and X are input into a VGG network with fixed parameters (which may also be other type of neural network). Pixel loss refers to the pixel-by-pixel loss of $X_G$ and X, such as Total Variation (TV) loss, L2 loss. When training the GAN network, the parameters of the discriminator may be fixed when the generator is trained, and the parameters of the generator may be updated by using weighted summing the three types of losses described above. When training the discriminator, the parameters of the generator are fixed, and the discriminator is updated by using classifying cross-entropy loss output by the discriminator after $X_G$ and X are input into the discriminator. The generator and discriminator are trained alternately until both of them are close to convergence, and thus the training of the GAN is completed. At this time, the style transfer image generated by the generator should be very close to the style transfer image ground truth with high quality.

Generally, in order to produce better result, the deep learning model often is designed with very complex network structure, which may cause the model to have a higher amount of parameters and a slower running speed. In order to allow the style transfer model to be run on a portable terminal device such as mobile phone and tablet in real time, and to be run on more types of terminal devices, lightweight processes are performed on model size of the style transfer model and running speed of the model on the electronic device in the embodiments of the application. Specifically, the network structure of the generator in the style transfer model is optimized, thereby reducing the model size and improving the running speed.

As an optional structure in the lightweight network structures of the generator provided by the embodiment of the application, a residual connection block may be used. Compared with a normal convolution operation, the residual connection block contributes to reducing the amount of parameters. In addition, the residual connection block has many bypass branches that directly connect the input to the subsequent layer, so that the subsequent layer may directly learn the residuals. Since the traditional convolution layer has more or less information loss or losses during information transmission, the residual connection block solves this problem to some extent. By directly bypassing the input information to the output to protect the integrity of the information, the entire network only needs to learn the difference part between the input and the output, thereby simplifying goal and difficulty of the learning.

In addition, the number of channels (the number of convolution kernels) of at least one convolution layer in this solution may also be reduced accordingly to further reduce the amount of parameters. For example, in the network structure of a generator shown in FIG. 17B, the number of convolution kernels of the convolution layers (which may be at least one of the convolution layer, the depth-wise convolution layer, or the deconvolution layer) may be correspondingly reduced according to actual needs.

Figure 17A:
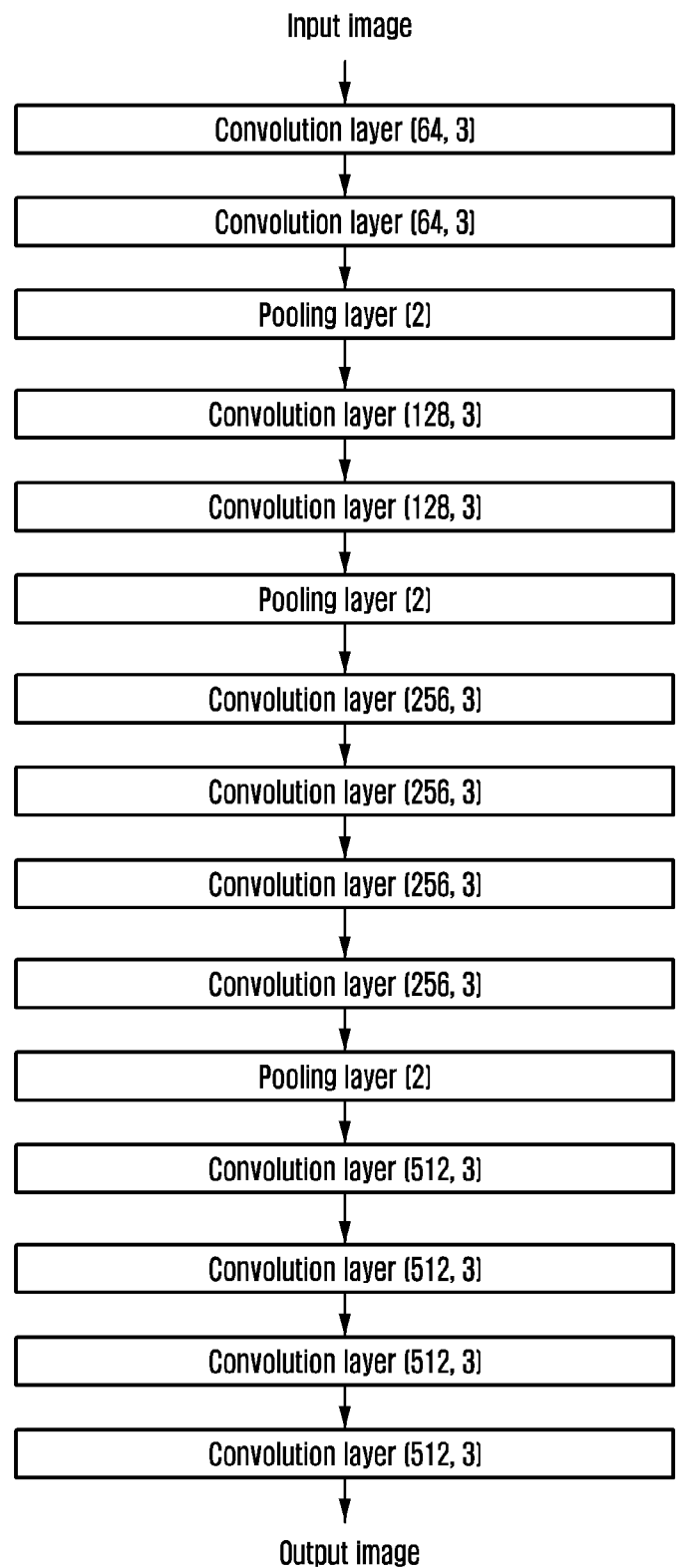
FIG. 17A is a schematic structural diagram illustrating an existing generator according to an embodiment of the disclosure.

FIG. 17A is a schematic structural diagram illustrating an existing generator according to an embodiment of the disclosure.

Referring to FIG. 17A, it is a schematic diagram illustrating network structure of an existing generator, which is a network structure based on VGG-19. The generator includes multilevel of convolution layers and pooling layers located between the convolution layers. Among the numbers followed the convolution layer, the first number represents the number of filters, that is, the number of convolution kernels, and the second number represents size of the convolution kernel. The number followed the pooling layer represents size of the pooling kernel of the pooling layer. For example, in the convolution layer (64, 3), 64 represents the number of convolution kernels, and 3 represents that the size of the convolution kernel is 3×3. The pooling layer (2) represents that the pooling kernel is 2×2. The model size of the VGG-19 network structure shown in FIG. 17A is about 115 Mb and processing on an image takes about 2500 ms, therefore the model is too large and the image processing speed is too slow, which may not meet the actual application requirement. In particularly, the applicability on the mobile terminal device is too poor.

Figure 17B:
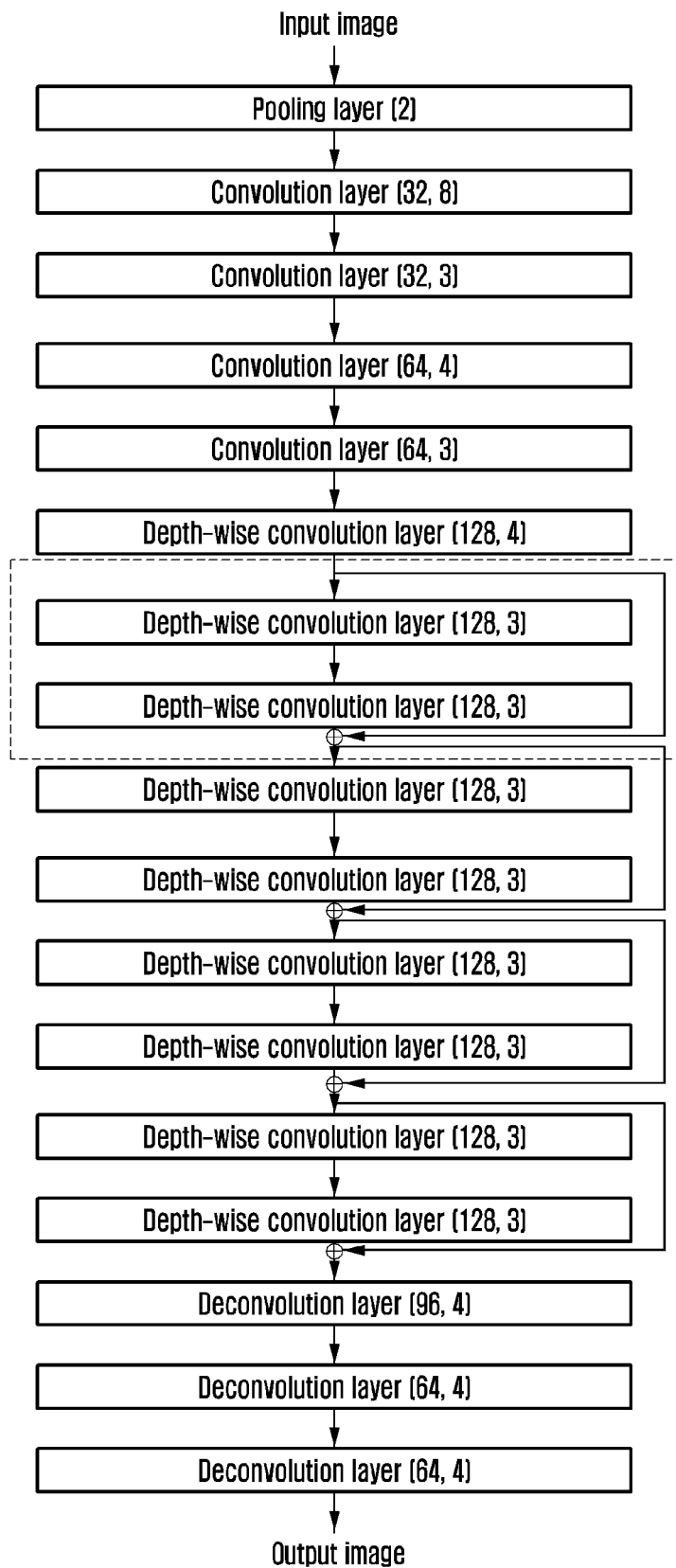
FIG. 17B is a schematic structural diagram illustrating a generator in an example according to an embodiment of the disclosure.

FIG. 17B is a schematic structural diagram illustrating a generator in an example according to an embodiment of the disclosure.

Referring to FIG. 17B, it is a schematic diagram illustrating network structure of a generator in a GAN network provided in an embodiment of the application. The network structure of the generator may include a pooling layer, four convolution layers, a depth-wise convolution layer, four residual connection blocks (the part enclosed by dashed line is a residual connection block), and three deconvolution layers. Based on this network structure, since the number of channels in the network structure is less than the number of channels used in the existing generator, for example, the number of channels of the convolution kernels in the network structure shown in FIG. 17B is less than the number of convolution kernels in the network structure shown in FIG. 17A, the model size of the network structure may be effectively reduced to achieve a lightweight structure. In addition, in this example, a depth-wise convolution layer structure may be used. Since the depth convolution layer has reduced parameters compared with convolution layer of the related art, usage of the depth-wise convolution layer may further reduce the amount of data to be processed. For example, size of the convolution kernel of the depth convolution layer (128, 4) shown in FIG. 17B is 4, that is, two consecutive convolution kernels 4×1 and 1×4 are used for calculating. The amount of parameters may be effectively reduced compared with the convolution layer of the related art (such as convolution layer (64, 3)).

As can be known from the foregoing description, compared with the convolution layer, the residual network in FIG. 17B, that is, the residual connection block, has better data processing effect, and the amount of parameters thereof may be further reduced. In addition, since the convolution operation may reduce the size of the original input image, the network structure in this example adds a deconvolution layer to achieve the effect of upsampling, thereby restoring the reduced feature map after convolution to the size of the input image, which improves the image processing effect and better meets the actual needs.

The model size of the lightweight generator shown in FIG. 17B is about 2 Mb, and the processing on an image takes about 250 ms. It can be seen that compared with the existing style transfer model structure, the size of the GAN network model provided in the embodiment of the application is significantly reduced, and the image processing efficiency has also been greatly improved, which better meets actual needs and improves user's usage experience.

In an optional embodiment of the application, the method further include:

segmenting the image to be processed through the object segmentation model to obtain an object probability distribution map corresponding to each image style included in the image obtained after the image to be processed is stylized, where each pixel point in the probability distribution map represents a probability that a pixel point corresponding to an element point in the image to be processed belongs to a pixel point of a segmentation category corresponding to the image style; when the segmentation category is transferred to the corresponding image style, each element point of the probability distribution map represents a probability that the pixel point corresponding to the element point in the image to be processed belongs to a pixel point of the image style, and fusing the stylized images corresponding to the image styles of the image to be processed to obtain an object image, based on the object probability distribution map corresponding to each image style.

Specifically, the fusing the stylized images corresponding to the image styles of the image to be processed to obtain an object image, based on the object probability distribution map corresponding to each image style may include:

using the object probability distribution map corresponding to each image style as a weight map of the corresponding stylized image, and weighted summing pixel values of pixel points in the stylized images respectively to obtain the pixel value of corresponding pixel point in the target image.

Optionally, when the object probability distribution map corresponding to each image style is used as a weight map of the corresponding stylized image, and pixel values of pixel points in the stylized image are weighted summed to obtain the pixel value of each pixel point in the target image, the following manners may be used:

preprocessing the object probability distribution map corresponding to each image style, and using the preprocessed object probability distribution map corresponding to each image style as the weight map of the corresponding stylized image, and weighted summing the pixel values of pixel points in the stylized images respectively to obtain the pixel value of corresponding pixel point in the target image.

The preprocessing may be a linear transformation process or a non-linear transformation process.

According to the result of object segmentation, after the style transfer is performed on the image of the target region in the image to be processed, if the style transfer is performed on part of the image to be processed, that is, the target region is part of region in the image to be processed, the non-target region in the image to be processed (i.e., the image in the region without style transfer) is fused with the image in transferred target region. Alternatively, if the style transfer is performed on each region in the image to be processed, that is, the target region is the entire image region, the images corresponding to the target regions of different styles need to be fused to obtain an image in which multiple styles coexist, that is, to obtain the stylized target image.

For convenience of description, the image style of the image to be processed, that is, the original image, is referred to as the original style, and the style to which the target region needs to be transferred is referred to as the target style.

The method provided in the embodiment of the application is applicable to a scene in which one or more style transfers are performed on an image. For the scene with only one style transfer, the image style in the transferred image includes the original style and one target style. For the scene with multiple style transfers on multiple target regions, based on different actual application requirements, the image styles included in the transferred image may be different. For example, if two different style transfers are performed on the foreground image region and background image region of an image, the transferred image contains two different target styles. For another example, if one style transfer is performed on one or more target regions in the image, another style transfer is performed on another one or more target regions, and there is also a non-target region, the transferred image includes two different target styles and one original style.

It may be understood that, for the same pixel point, the sum of the values of the element point, corresponding to the pixel point, on the object probability distribution map corresponding to each image style is 1. The value of the above probability may specifically be floating-point data, and may specifically be a value ranging from [0.0, 1.0].

In practical application, since the result of object segmentation are highly correlated with the performance of the segmentation model used, there is a possible for the transition region to be too large or small. To avoid the transition region being too large or small so as to influence the fusion effect between different stylized images in the transition region, the object probability distribution map corresponding to each stylized image may be preprocessed before the fusion of stylized images. Specifically, if the transition region is too small, the transition is not smooth enough, then a fuzzy algorithm may be used for processing, and the application will not repeat herein. If the transition region is too large, the object probability distribution map may be transferred again to reduce the transition region. The transfer method includes, but is not limited to, a linear transformation and a non-linear transformation.

It should be noted that, in practical application, the preprocessing on the object probability distribution map may be performed inside the segmentation model or outside the segmentation model. For example, if the preprocessing is used as a layer structure of the model, a preprocessing layer is connected to the output layer of the object probability distribution map. Alternatively, the preprocessing may be performed outside the model after the object probability distribution map is output through the model.

The image fusion scheme provided in an embodiment of the application will be described below with specific examples.

Example 1

In this example, the scene in which the style transferred image contains two styles is used as an example for description. The two styles may be the original style and the target style, or two target styles. This example takes the two styles being the original style and the target style as an example.

In this example, it is assumed that the style transfer is performed only on the background image region in the image to be processed, and not on the foreground image region. Specifically, after segmenting the image to be processed to obtain the background image region in the image to be processed, the style transfer may be performed on the background image region to obtain a corresponding stylized image. As described in the foregoing description, when performing the style transfer, it is possible to only transfer the style of the background image region. After the transfer is completed, the transferred background image region are fused with the foreground image region in the image to be processed to obtain a corresponding stylized image. Alternatively, the entire image to be processed may be transferred, and the background image region in the transferred image are fused with the foreground image region in the image to be processed before transfer to obtain a corresponding stylized image.

For the image to be processed, the object probability distribution maps corresponding to the original style and the target style respectively in the transferred image may be obtained through the image segmentation model. Since when only two image styles are included, for one pixel point in the image, the sum of the corresponding probabilities in these two probability distribution maps is 1. Therefore, in practical application, when the transferred image contains only two styles, the object segmentation model may output only one of the object probability distribution maps (may be recorded as $P_2$), and another object probability distribution map may be expressed as $1-P_2$. After obtaining the object probability distribution map corresponding to each style, the stylistic image corresponding to the original style may be fused with the stylistic image corresponding to the target style based on the two probability distribution maps.

Specifically, it may be achieved through the following formula:

$$\text{Output\_style} = P_2 \cdot \text{Foreground\_style} + (1-P_2) \cdot \text{Background\_style} \quad \text{Equation 3}$$

Where, Output_style represents a target image, Foreground_style represents a stylistic image corresponding to the foreground style (i.e., the original style) in the image to be processed, that is, the original image, Background_style represents a stylistic image corresponding to the background style (i.e., the target style) in the image to be processed, which may be understood as the image obtained after the image to be processed is transferred based on the target style, $P_2$ represents the object probability distribution map corresponding to the foreground style, and $1-P_2$ represents the object probability distribution map corresponding to the target style.

In the embodiment of the application, the representation manner of the object segmentation result is an object probability distribution map, that is, the probability that each pixel point in the original image belongs to the foreground object, the value range of which may be expressed as $[a_1, a_2]$. The embodiment of the application does not specifically limit on $a_1$ and $a_2$, and $[a_1, a_2]$ generally may be [0, 1] or [0, 100], where 0 indicates that the pixel point is not a foreground object, that is, the pixel point is a pixel point in the background region, and 1 or 100 indicates that the pixel point is a foreground object, that is, the pixel point is a pixel point in the foreground region. [0, 1] is used as an example for description below.

FIG. 18A is a schematic diagram illustrating an image probability distribution map according to an embodiment of the disclosure.

Referring to FIG. 18A, in the prior art, the object segmentation result is usually a result after binary process on the object probability map. That is, a probability threshold $a_0$ is set, when the probability of the object is greater than $a_0$, the probability of the pixel point is set to be 1, otherwise is set to be 0. FIG. 18A is a schematic diagram illustrating an object probability distribution map $p_0$. Based on the existing scheme, if the probability threshold $a_0$ is 0.5, the probability value not less than 0.5 in the object probability distribution map $p_0$ is binarized to be 1, and the probability value less than 0.5 is binarized to be 0.

FIG. 18B is a schematic diagram illustrating a probability distribution map after binarizing the probability distribution map shown in FIG. 18A according to the related art.

Referring to FIG. 18B, it shows the binarized object probability distribution map $p_1$. When the binarized object probability distribution map $p_1$ is directly used for fusing the object region and the background, severe visual contrast may be appear in the transition part. In the prior art, the $p_1$ is generally blurred to smooth the transition region. However, this operation makes the size of the transition region constant, fails to maintain consistency with the original transition region, and thus has poor visual effects. In view of the foregoing problem in the prior art, the embodiment of the application proposes to perform the style transfer on the foreground image region in the image to be processed and not perform the style transfer on the background image region, such that the target image includes the original style and a target style. Based on the image soft segmentation scheme provided by the embodiment of the application, the object soft segmentation result object probability distribution map proposed by the application may be directly used as a template for fusing the foreground and the background. Since the result output by the object segmentation model is the object probability distribution map, and the probability distribution map may be a probability distribution map of the object foreground, i.e., the target style (that is, a probability of each pixel point corresponding to each element point in the distribution map being in the foreground image region in the image to be processed, that is, the probability of the pixel point being a pixel point of the target style), or a probability distribution map of the object background, i.e., the original style, the size and position of the transition region in the original image are retained to the greatest extent if the probability distribution map is directly used as a template for fusing the foreground and the background, thereby making the transition region more natural and getting better visual effects.

Specifically, the fusion the images of the non-target region and the transferred target region in the image to be processed includes any of the following.

A: For any pixel point in the image to be processed, if the target region probability value of the pixel point is not greater than a first set probability value, the target region probability value of the pixel point is set to be the set minimum probability value, B: For any pixel point in the image to be processed, if the target region probability value of the pixel point is not less than a second set probability value, the target region probability value of the pixel point is set to be the set maximum probability value, and C: For any pixel point in the image to be processed, if the target region probability value of the pixel point is between the first set probability value and the second set probability value, the transform processing (such as linear transformation processing) is performed on the target region probability value of the pixel point.

The second set probability value is greater than the first set probability value, and the maximum probability value is greater than the minimum probability value.

In addition, since the result of object segmentation is highly correlated with the performance of the segmentation model used, there is a possible for the transition region to be too large or small. If the transition region is too small, the transition is not smooth enough, then it may be processed by fuzzy algorithms, and the application will not repeat herein. If the transition region is too large, the original segmentation model result may be transferred again to reduce the transition region. The transfer method includes, but is not limited to, a linear transformation and a non-linear transformation.

As an example, taking the linear transformation as an example, two probability thresholds $\alpha_0$ and $\alpha_1$ may be set as the probability thresholds of the background and the object respectively. If the object probability value $p_0 \leq \alpha_0$, the object probability value here may be set to be 0. If the object probability value $p_0 \geq \alpha_1$, the object probability value here may be set to be 1. The rest may be processed according to the following linear transformation formula.

$$p2 = \frac{p0 - \alpha 0}{\alpha 1 - \alpha 0} \qquad \text{Equation 4}$$

FIG. 18C is a schematic diagram illustrating a probability distribution map after a linear transformation is performed on the probability distribution map shown in FIG. 18A in an example according to an embodiment of the disclosure.

Referring to FIG. 18C, the object probability distribution map $p_2$ obtained by transferring the probability distribution map in FIG. 18A is shown in FIG. 18C. It may be seen by comparing FIG. 18A with FIG. 18C that the transition region after the transfer processing is smaller than that of the original object probability map $p_0$, which is more in line with the actual situation.

Figure 18D:
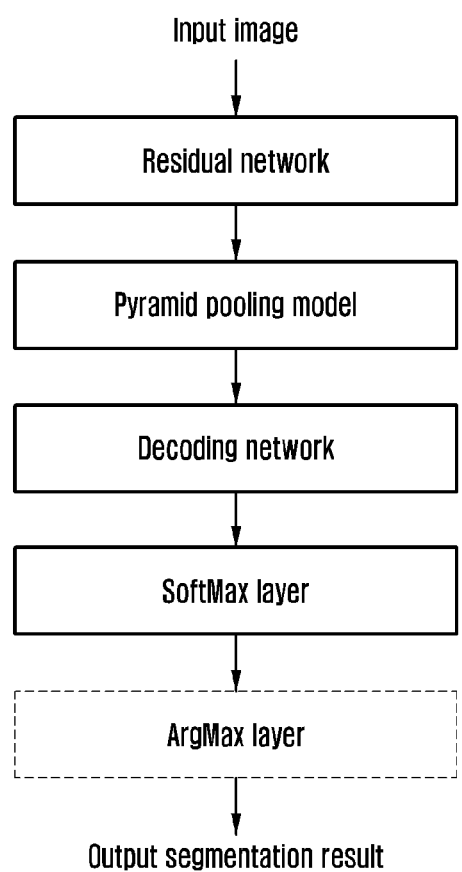
FIG. 18D is a schematic structural diagram illustrating an object segmentation model according to the related art.

FIG. 18D is a schematic structural diagram illustrating an object segmentation model according to the related art.

Referring to FIG. 18D, it is a schematic structural diagram illustrating an existing object segmentation model. The object segmentation model specifically includes a residual network, a pyramid pooling module, a decoding network, a SoftMax layer, and an Argmax layer that are cascaded in sequence. For the residual network and pyramid pooling module, please refer to the description of the residual network and pyramid pooling module in FIG. 14A, and the decoding network, SoftMax layer, and Argmax layer correspond to the specific implementation of the last layer of the convolution structure shown in FIG. 14A. The decoding network is used to up-sample the stitched feature map, project the feature map to the pixel space, and implement the labeling of category of each pixel point via the SoftMax layer and Argmax layer, that is, the segmentation result of each pixel. In the existing model, for the output of the SoftMax layer, each output channel represents a category, and the value of each element point in the feature map (also may be referred to as the probability distribution map) corresponding to each channel in the SoftMax layer is the probability that the corresponding pixel belongs to the category corresponding to the channel. The Argmax layer followed the SoftMax layer is used to compare the values of the pixel points in the probability distribution map of the output channels in the SoftMax layer, and select the category corresponding to maximum probability value of each pixel point as the final category of the pixel point, so as to obtain the binarized classification result of each pixel point. For each image style contained in the target image, one image style may correspond to one category. In the segmentation result output by the existing segmentation model, for each pixel point, there is only a binarization result that the corresponding style result is this category or not this category.

Figure 18E:
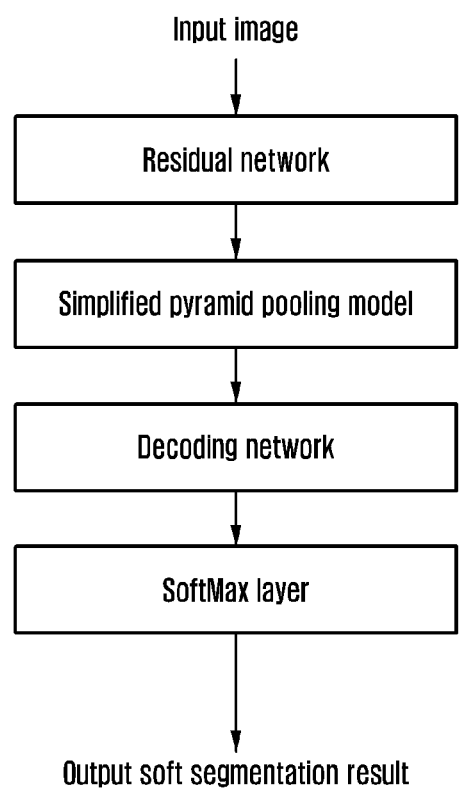
FIG. 18E is a schematic structural diagram illustrating an object segmentation model according to an embodiment of the disclosure.

FIG. 18E is a schematic structural diagram illustrating an object segmentation model according to an embodiment of the disclosure.

Referring to FIG. 18E, based on the image soft segmentation scheme provided by the embodiment of the disclosure, FIG. 18E is a schematic structural diagram illustrating an object segmentation model based on the principle of this scheme. Comparing with FIG. 18D, it may be known that the model may not only replace the existing pyramid pooling module with the concise pyramid pooling module provided in the application (such as the pyramid pooling model shown in FIG. 14B), but also remove the Argmax layer to use the output of the Softmax layer as the final output, so that a probability distribution map corresponding to more categories may be obtained, that is, the probability that each pixel point belongs to each category may be obtained, instead of a simple result of 0 or 1. Thus, a softer image style is realized, and a more natural fusion result is obtained when fusing stylized images based on the segmentation result.

Figure 18F:
FIG. 18F is a schematic diagram illustrating effect of multi-stylistic image fusion based on an existing image segmentation technique according to an embodiment of the disclosure.

FIG. 18F is a schematic diagram illustrating effect of multi-stylistic image fusion based on the existing image segmentation technique according to an embodiment of the disclosure.

Figure 18G:
FIG. 18G is a schematic diagram illustrating effect of multi-stylistic image fusion based on a soft segmentation technique proposed in according to an embodiment of the disclosure.

FIG. 18G is a schematic diagram illustrating effect of multi-stylistic image fusion based on a soft segmentation technique proposed in according to an embodiment of the disclosure.

Referring to FIGS. 18F and 18G, they are respectively schematic diagrams illustrating the effects of fusing images with different styles based on the segmentation results of the existing object segmentation model and the object segmentation model provided in the embodiment of the application. In this example, the style transfer is performed on the background part of the image, and not on the foreground part (the person wearing a hat, wherein the person in the image is not fully shown), that is, the foreground corresponds to a style and the background corresponds to another style. For the transition region between the foreground part and the background part in the target image (that is, the edge part of different regions), taking the region circled by the black ellipse in the two pictures as an example, as can be seen from the two pictures, the fusion effect is not ideal and the edge part is not natural enough in FIG. 18G, however, the fusion effect is significantly improved compared to that in FIG. 18G and the visualization effect of the edge part is more natural in FIG. 18F.

By applying the solution provided in the embodiment of the application, a result of stylizing the background image or a result of stylizing the object may be obtained. For an image without an object, a style transfer model is directly applied for artistic style transfer. For an image with an object, an object segmentation module and a style transfer model are applied to achieve different artistic style transfer for the object and the background. The object segmentation model may ensure its accuracy through a rotation angle prediction module and an object detection module, thereby better meeting the actual needs.

It may be understood that the rotation angle prediction scheme and object segmentation scheme in the solutions provided in the embodiments of the application are not only applicable to the processing of style transfer in the image, but also applicable to other image processing solution that requires image segmentation. For example, for a processing solution for editing a specified object or a specified region in an image of the related art, the target region in the image (i.e., a region to be processed) may be obtained by performing segmentation processing on the image based on the solution provided in the embodiment of the application, to improve the accuracy of image segmentation, thus improve the processing effect and efficiency of the image.

The following provides a specific optional example to describe the solution provided by the application.

Figure 19:
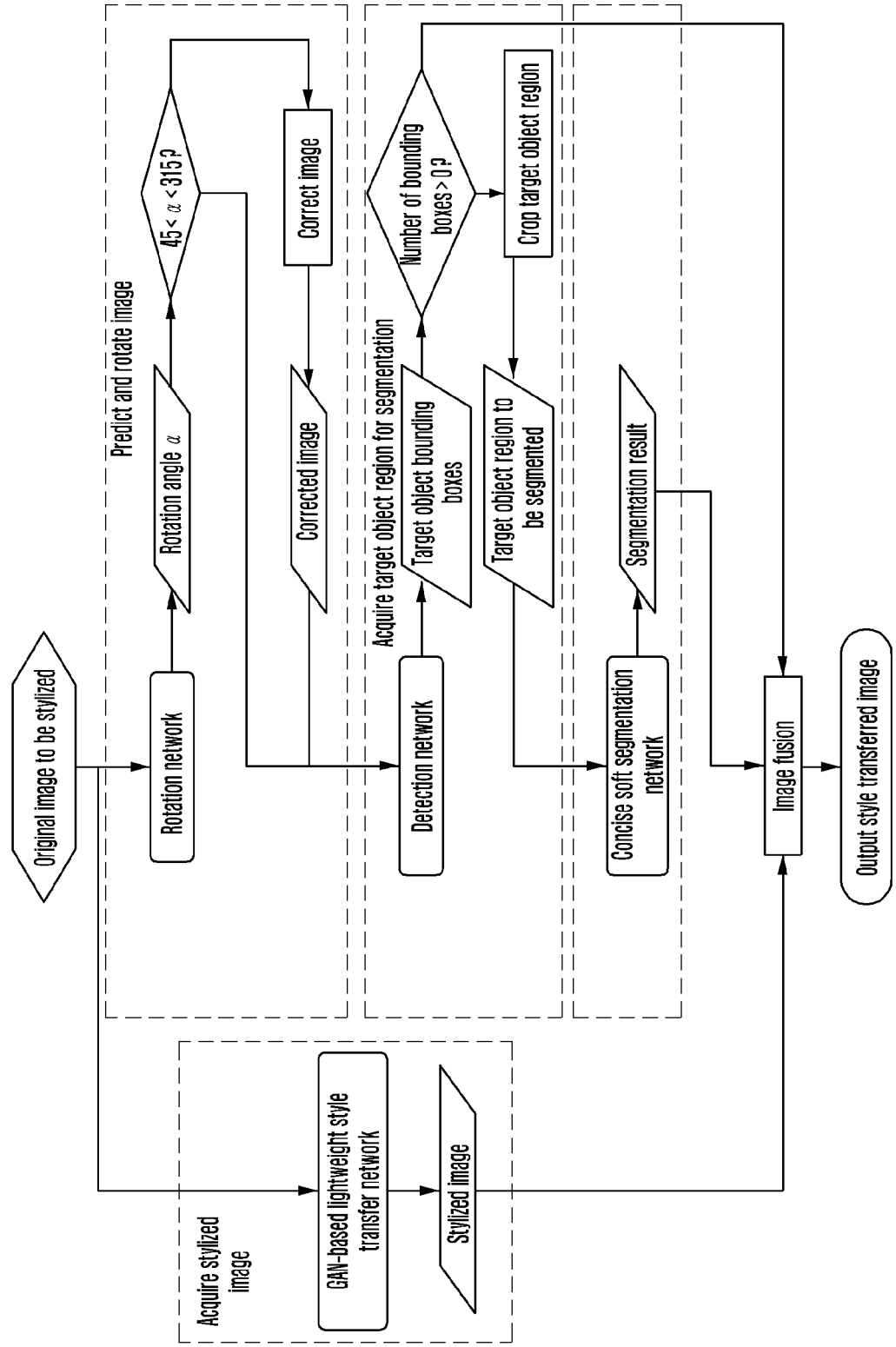
FIG. 19 is a schematic diagram illustrating a principle of an image processing method in an example according to an embodiment of the disclosure.

FIG. 19 is a schematic flowchart illustrating the principle in this optional example according to an embodiment of the disclosure.

Referring to FIG. 19, the image processing method in this example may mainly include the following steps:

obtaining the image to be processed, that is, the original image to be stylized, and segmenting the image to be processed to obtain the target region in the image to be processed, that is, the step of obtaining a stylized image. Specifically, after determining each target region in the image to be processed, the image style transfer on the target region may be implemented through the GAN-based lightweight style transfer model (may also be referred to as the style transfer network, such as the network structure shown in FIG. 17B) provided in the embodiments of the application, to obtain the transferred image (the stylized image). A specific manner for segmenting the image to be processed to obtain the target region that needs to be stylized may be an existing image segmentation manner.

For the image to be processed, in order to improve the accuracy of image segmentation, the rotation correction may firstly be performed on the image, that is, the rotation angle corresponding to the image to be processed is predicted, and the image to be processed is rotation corrected based on the rotation angle to obtain a corrected image, which corresponds to the step of predicting and rotating the image. This step may be implemented by an angle prediction model (corresponding to the rotation network, such as the model structure shown in FIG. 7B). Specifically, the image to be processed is input into this model, and the rotation angle α of the image to be processed is obtained through this model. In this example, a condition for determining whether the rotation correction is performed on the image (that is, the rotation angle range 45° to) 315° are pre-configured. If the rotation angle α predicted by the angle prediction model is in the angle range, the image to be processed is corrected based on the rotation angle (the correcting image) to obtain a corrected image; if the predicted rotation angle α does not belong to this angle range, no rotation correction is performed.

After the above correction processing is completed, the target object region (that is, the object region that meets the preset condition) may be detected on the basis of the uncorrected image or the corrected image. Specifically, it may be implemented through the image detection model (the detection network). For example, through the solution shown in FIG. 3, the image to be detected (that is, the uncorrected image or the corrected image) may be input into an image detection model, and whether an object exists in the image is detected by the image detection model and thus the detection result is obtained. The detection result specifically is the position information of the target object bounding box in the image. If it is determined that the number of bounding boxes is greater than 0, that is, the model outputs the position information on at least one bounding box, it means that there is an object region, and then the object region may be cropped according to the position information of the bounding box to obtain each target region. These detected object regions are image regions that need to be segmented. If there is no object region, that is, the number of bounding boxes is 0, it means that there is no object region in the image that meets the preset condition, and then deep object segmentation processing may not be performed.

After obtaining each object region, the object segmentation model based on the soft segmentation scheme (the concise soft segmentation network) provided by the embodiment of the application may be used for segmentation, to obtain an object probability distribution map corresponding to each image style included in the style transferred image. After that, based on the object probability distribution map corresponding to each image style, the stylized images corresponding to image styles in the image to be processed are fused to obtain the target image (that is, outputting the style transferred image).

Compared with the existing image processing method, the image processing method provided in the embodiment of the application has at least the following effects.

1) The application proposes that the object rotation angle prediction and correction module may be added before the object region is determined. This module may predict the rotation angle corresponding to the image. For an image rotated by the user during image editing processing, or an image taken in a non-horizontal direction or a non-vertical direction, the rotation angle required to put the image upright is predicted. The object region in the image is determined after the image is put upright, based on the predicted rotation angle, so that the accuracy of determining the object region, and the accuracy of object segmentation may be improved.

2) The application proposes that when determining the object region, the method of object segmentation based on the neural network may be used. This method may not only achieve segmentation based on different object categories, but also accurately segment objects when there is an overlapping region between the objects, which improves the accuracy and flexibility of determining the object region. The object segmentation scheme in the embodiment of the application is not only applicable to a segmentation model of a person, but also applicable to a segmentation model of object other than a person, which may effectively improve the accuracy of each segmentation model. In practical application, multiple segmentation models may be used to detect and segment multiple types of objects, or multiple segmentation models may be used to detect and segment different types of objects respectively. In addition, when segmenting the image, the rotation corrected image may be segmented, or the target region in the corrected image may be detected firstly and then the detected object region may be segmented to further improve the segmentation accuracy. In the method, when the proportion of the region occupied by the object in the image is small, the segmentation is performed based on the object region. Since the proportion of the object in the detected object region is larger, the segmentation effect is better.

3) The application proposes that before object segmentation, the object detection module may be added. Bounding box of the object (that is, the first object region) may be obtained through this module. Based on the bounding box of the object, object that meets requirement, that is, the preset condition, may be detected, which may improve the accuracy of object segmentation and reduce the amount of data that needs to be further processed. In addition, the probability that the segmentation result contains pixels of unrelated categories is reduced, thereby improving the segmentation accuracy.

4) The solution provided in the application is optimized for the mobile terminal device with limited computing power, but is not limited to deployment on the mobile device. The solution in the embodiments of the application may be applied to more types of terminal devices, and greatly improves the user experience on the mobile terminal device.

5) The object segmentation scheme provided in the application may make the object segmentation more robust and make the final segmentation result maintain good segmentation accuracy even for a complex image to be processed, by multiple processing methods, such as the rotation correcting the image, segmenting the image based on the segmentation on the object region.

An embodiment of the application proposes an image style transfer system based on object segmentation to realize rapid generation of artistic creation from a real picture. The embodiment of the application proposes to perform appropriate preprocessing on the input image to improve the accuracy of object segmentation, improve and optimize the original image style transfer algorithm, and improve the visual effect of the stylized output image, and perform a lot optimization with respect to the problem of limited computing power of the mobile terminal, but it is not limited to deployment on the mobile device, which greatly improves the user experience on the mobile terminal device.

In an example, a system for performing style transfer processing on an image may include:

1. a preprocessing module: configured to detect the object region and the rotation angle of the object in the image, and perform rotation correction on the image;

2. an object segmentation module: configured to, for the corrected image, accurately segment the object region in the image and output the object probability map;

3. a style transfer module: configured to apply the target style to the object and/or the background; and 4. a post-processing module: configured to fuse the object and the background based on object segmentation result.

Figure 18H:
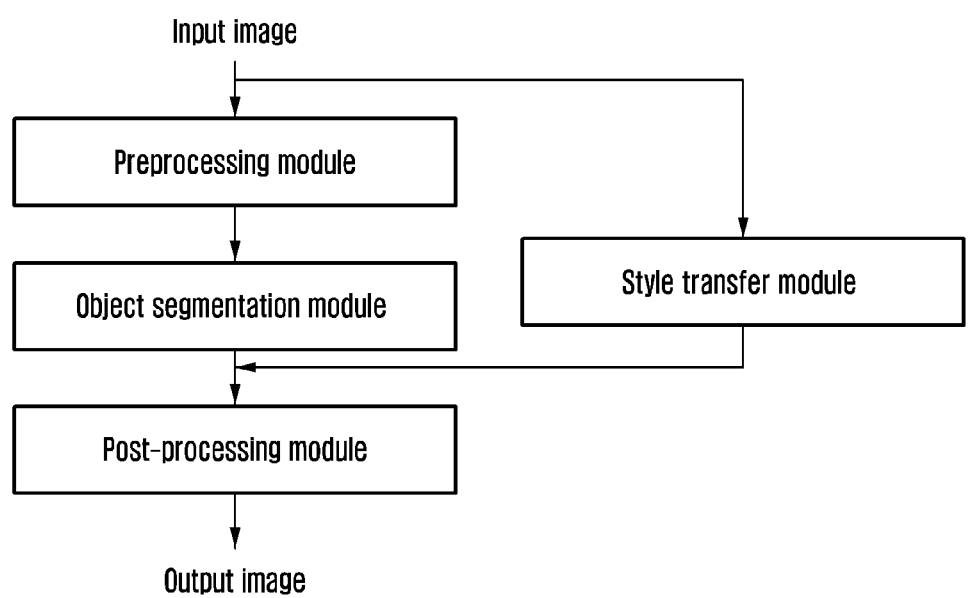
FIG. 18H is a schematic flowchart illustrating an image style transfer processing in an example according to an embodiment of the disclosure.

FIG. 18H is a schematic flowchart illustrating an image style transfer processing in an example according to an embodiment of the disclosure.

Referring to FIG. 18H, when performing the style transfer, the style transfer may be performed on the entire original image (that is, the input image). If the user chooses to transfer the target object to the first target style and not change the background image, when performing the style transfer, the style transfer module transfers the entire original image to the first target style, and then during the post-processing, the post-processing module fuses the region of the stylized target object with the background image in the original image based on the segmentation result of the object segmentation module. Or, if the user chooses to transfer the background image to the second target style and not change the target object, when performing the style transfer, the style transfer module transfers the entire original image to the second target style, and then during the post-processing, the post-processing module fuses the region of the stylized background image with the region of the target object in the original image based on the segmentation result of the object segmentation module. Or, if the user chooses to transfer the target object to the first target style and the background image to the second target style, when performing the style transfer, the style transfer module transfers the entire original image to the first target style and the second target style respectively, and then during the post-processing, the post-processing module fuses the region of the target object transferred to the first target style and the region of the background image transferred to the second target style based on the segmentation result of the object segmentation module, to obtain an output image. In addition, before the object segmentation module performs the segmentation processing, the preprocessing module may predict the rotation angle of the image and perform rotation correction on the image according to the rotation angle.

Figure 18I:
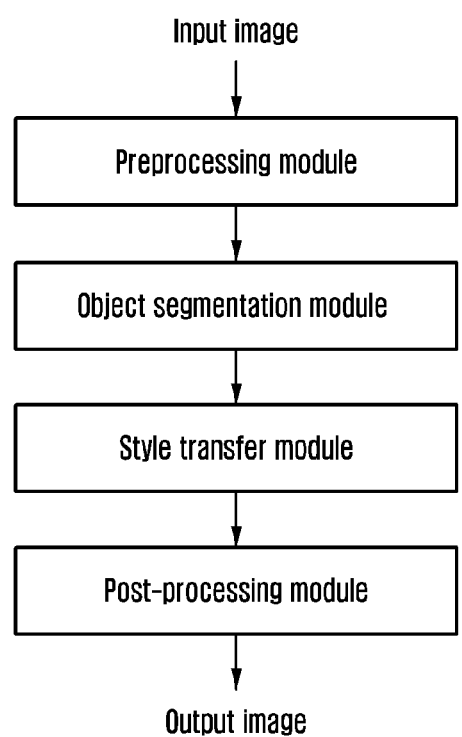
FIG. 18I is a schematic flowchart illustrating an image style transfer processing in another example according to an embodiment of the disclosure.

FIG. 18I is a schematic flowchart illustrating an image style transfer processing in another example according to an embodiment of the disclosure.

Referring to FIG. 18I, when performing the style transfer, the style transfer may be performed only on the region that needs to be transferred. If the user chooses to transfer the target object to the first target style and not change the background image, when performing the style transfer, the style transfer module only transfers the region of the target object to the first target style based on the segmentation result of the object segmentation module, and then during the post-processing, the post-processing module fuses the region of the stylized target object with the background image in the original image. Or, if the user chooses to transfer the background image to the second target style and not change the target object, when performing the style transfer, the style transfer module only transfers the region of the background image to the second target style based on the segmentation result of the object segmentation module, and then during the post-processing, the post-processing module fuses the region of the stylized background image with the region of the target object in the original image. Or, if the user chooses to transfer the target object to the first target style and the background image to the second target style, when performing the style transfer, the style transfer module transfers the region of the target object to the first target style and transfers the region of the background image to the second target style respectively based on the segmentation result of the object segmentation module, and then during the post-processing, the post-processing module fuses the region of the target object transferred to the first target style and the region of the background image transferred to the second target style, to obtain an output image. In addition, before the object segmentation module performs the segmentation processing, the preprocessing module may predict the rotation angle of the image and perform rotation correction on the image according to the rotation angle.

Based on the same principle as the method shown in FIG. 1, an embodiment of the application further provides an image processing apparatus.

Figure 20:
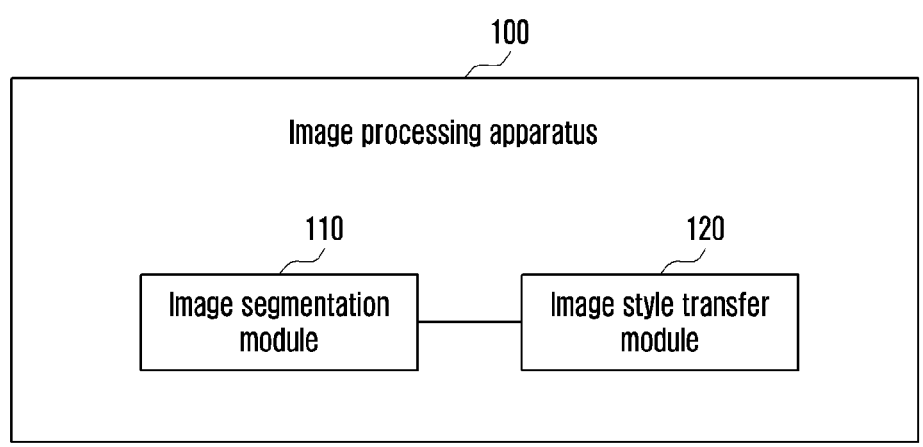
FIG. 20 is a schematic structural diagram illustrating an image processing apparatus according to an embodiment of the disclosure.

FIG. 20 is a schematic structural diagram illustrating an image processing apparatus according to an embodiment of the disclosure.

Referring to FIG. 20, the image processing apparatus 100 may include an image segmentation module 110 and an image style transfer module 120.

The image segmentation module 110 is configured to segment an image to be processed to obtain a target region in the image to be processed.

The image style transfer module 120 is configured to perform style transfer on the target region.

Optionally, when segmenting the image to be processed, the image segmentation module 110 is specifically configured to:

predict a rotation angle corresponding to the image to be processed, perform rotation correction on the image to be processed according to the rotation angle, and segment the corrected image to be processed.

Optionally, when predicting the rotation angle corresponding to the image to be processed, the image segmentation module 110 is specifically configured to:

detect a first object region where an object is located in the image to be processed, and predict a rotation angle corresponding to the first object region, which is considered as the rotation angle corresponding to the image to be processed.

Optionally, the first object region is an object region meeting a preset condition. The preset condition includes at least one of the following:

an object region at a specified position, a region where a specified object is located, a region where an object of a specified category is located, and an object region satisfying a preset region size.

Optionally, when predicting the rotation angle corresponding to the image to be processed, the image segmentation module 110 is specifically configured to:

determine the rotation angle corresponding to the image to be processed, according to the rotation angle of the object in the image to be processed.

Optionally, if the image to be processed includes at least two objects, when determining the rotation angle corresponding to the image to be processed according to the rotation angle of the object in the image to be processed, the image segmentation module 110 is specifically configured to:

determine the rotation angle of an object with the largest area ratio in the image to be processed as the rotation angle corresponding to the image to be processed, or fuse the rotation angles of the objects in the image to be processed, and determining the fused rotation angle as the rotation angle corresponding to the image to be processed, or determine the rotation angles of the objects as the rotation angle corresponding to the image to be processed, respectively.

Optionally, when the rotation angles of the objects are determined as the rotation angle corresponding to the image to be processed respectively, when performing rotation correction on the image to be processed according to the rotation angle, the image segmentation module 110 may be specifically configured to:

perform the rotation correction on the regions where the objects are located separately according to the corresponding rotation angles respectively.

Correspondingly, when segmenting the corrected image to be processed, the image segmentation module 110 may be specifically configured to:

segmenting the rotation corrected regions where the objects are located separately, and then fusing segmentation results of the regions where the objects are located separately to obtain the segmentation result of the image to be processed, or merging the rotation corrected regions where the objects are located separately, and segmenting merged image to obtain the segmentation result of the image to be processed.

Optionally, when predicting the rotation angle corresponding to the image to be processed, the image segmentation module 110 is specifically configured to:

predict the rotation angle corresponding to the image to be processed through an angle prediction model, wherein the angle prediction model includes an image feature extraction module, and the number of BN layers in at least one feature extraction unit of the image feature extraction module is less than a set value.

Optionally, the image segmentation module 110 predicts the rotation angle of the object in the image to be processed in the following manner:

detecting skeleton keypoints of the object through a posture estimation model, and predicting the rotation angle of the object based on the skeleton keypoints of the object.

Optionally, when predicting the rotation angle of the object based on the skeleton keypoints of the object, the image segmentation module 110 may be specifically configured to:

predict the rotation angle of the object, according to position relationship between at least two keypoints among the skeleton keypoints of the object.

Optionally, the at least two keypoints include at least two corresponding skeleton keypoints of the object.

Optionally, when performing the rotation correction on the image to be processed according to the rotation angle, the image segmentation module 110 is specifically configured to:

perform the rotation correction on the first object region.

When segmenting the corrected image to be processed, the image segmentation module 110 is specifically configured to:

segment the corrected first object region, and obtain a segmentation result of the object to be processed based on the segmentation result of the first object region.

Optionally, when segmenting the image to be processed, the image segmentation module 110 is specifically configured to:

detect second object regions where objects are located in the image to be processed respectively, segment the second object regions respectively, or merging the second object regions to obtained a merged image and segmenting the merged image, and obtain segmentation result of the image to be processed based on segmentation results of the second object regions.

Optionally, the second object region is an object region meeting a preset condition in the image to be processed or corrected image to be processed.

Optionally, when segmenting the image to be processed, the image segmentation module 110 is specifically configured to:

segment the image to be processed through an object segmentation model, wherein, the object segmentation model is obtained by training a neural network.

Optionally, the target region includes a region where an object of a specified category is located in the image to be processed.

Optionally, the image processing apparatus 100 may further include:

a processing request receiving module, configured to receive a style transfer request including information on the specified category of the object that needs to be stylized.

Optionally, the object segmentation model includes a PSPNet, wherein the number of layers in a pyramid pooling module in the PSPNet is less than a set number.

Optionally, when performing the style transfer on the target region, the image style transfer module 120 is specifically configured to:

perform an image style transfer on the target region through a style transfer model, wherein the style transfer model includes a GAN, and a network structure of a generator in the GAN satisfies any of the following conditions:

including a convolution layer, a residual network, and a deconvolution layer cascaded sequentially, including a convolution layer and a deconvolution layer cascaded sequentially, including a convolution layer, a depth-wise convolution layer, and a deconvolution layer cascaded sequentially, and including a convolution layer, a depth-wise convolution layer, a residual network and a deconvolution layer cascaded sequentially, and the number of channels in at least one convolution layer being less than a set number.

Optionally, the image processing apparatus 100 may further include an image fusion module, which is configured to:

segment the image to be processed through the object segmentation model to obtain an object probability distribution map corresponding to each image style included in the image obtained after the image to be processed is stylized, where each pixel point in the object probability distribution map represents a probability that a pixel point corresponding to an element point in the image to be processed belongs to a pixel point of a segmentation category corresponding to the image style; when the segmentation category is transferred to the corresponding image style, each element point in the probability distribution map represents the probability that the pixel point corresponding to the element point in the image to be processed belongs to the pixel points of the image style in the target image, and fuse the stylized images corresponding to the image styles of the image to be processed to obtain an object image, based on the object probability distribution map corresponding to each image style.

Optionally, when fusing the stylized images corresponding to the image styles of the image to be processed to obtain the object image, based on the object probability distribution map corresponding to each image style, the image fusion module may specifically be configured to:

using the object probability distribution map corresponding to each image style as a weight map of the corresponding stylized image, and weighted summing pixel values of pixel points in the stylized images respectively to obtain the pixel value of corresponding pixel point in the target image.

Optionally, when fusing the stylized images corresponding to the image styles of the image to be processed, based on the object probability distribution map corresponding to each image style, the image fusion module may specifically be configured to:

transfer each object probability distribution map, and based on the object probability distribution map corresponding to each image style after transfer, fuse the stylized images corresponding to the image styles of the image to be processed.

Based on the same principle as the image processing method and the image processing apparatus provided in the embodiments of the application, an embodiment of the application further provides an electronic device, which includes a processor and a memory. The memory is configured to store machine-readable instruction. The processor is configured to perform the image processing method shown in any embodiment of the application when executing the machine-readable instruction.

An embodiment of the application further provides a computer-readable storage medium, on which computer instruction is stored. When the computer instruction is executed by the processor, method shown in any embodiment of the application is performed.

Figure 21:
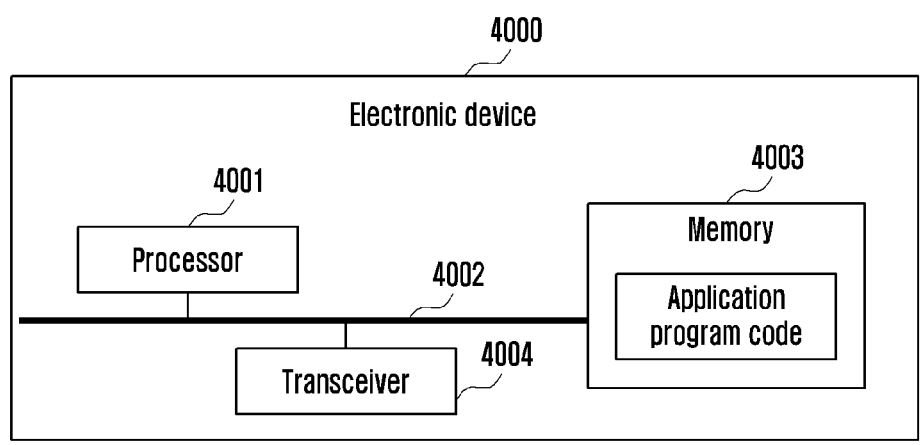
FIG. 21 is a schematic structural diagram illustrating an electronic device according to an embodiment of the disclosure.

FIG. 21 is a schematic structural diagram illustrating an electronic device according to an embodiment of the disclosure.

Referring to FIG. 21, it is a schematic structural diagram illustrating an electronic device 4000 suitable for the embodiments of the application. As shown in FIG. 21, the electronic device 4000 may include a processor 4001 and a memory 4003. The processor 4001 is connected to the memory 4003, for example, via a bus 4002. Optionally, the electronic device 4000 may further include a transceiver 4004. It should be noted that the transceiver 4004 is not limited to one in actual application, and the structure of the electronic device 4000 is not limited to the embodiment of the application.

The processor 4001 may be a central processing unit (CPU), a general-purpose processor, a digital signal processor (DSP), an application specific integrated circuit (ASIC), a field programmable gated array (FPGA) or other programmable logic device, transistor logic device, hardware component, or any combination thereof.

Various logic blocks, modules, and circuits described in connection with the disclosure may be implemented or executed. The processor 4001 may also be a combination that implements computing functions, such as a combination that includes one or more microprocessors, a combination of DSP and microprocessors, etc.

The bus 4002 may include a path to transfer information between the above components. The bus 4002 may be a peripheral component interconnect (PCI) bus or an extended industry standard architecture (EISA) bus or the like. The bus 4002 may be divided into an address bus, a data bus, a control bus, etc. For ease of representation, the bus is expressed by only one thick line in FIG. 21, but it does not mean that there is only one bus or one type of bus.

The memory 4003 may be a read only memory (ROM) or other types of static storage device that may store static information and instructions, a random access memory (RAM) or other types of dynamic storage device that may store information and instructions. It may also be an electrically erasable programmable read only memory (EEPROM), a compact disc read only memory (CD-ROM) or other optical disc storage, disc storage (including compact disc, laser disc, optical disc, digital versatile disc, Blu-ray disc, etc.), magnetic disc storage medium or other magnetic storage device, or any other medium capable of carrying or storing desired program code in the form of instructions or data structures and capable of being accessed by a computer, but is not limited thereto.

The memory 4003 is configured to store application program codes for performing the solution of the application, and is controlled by the processor 4001. The processor 4001 is configured to execute the application program codes stored in the memory 4003 to implement the solution shown in any of the foregoing method embodiments.

It should be understood that although various steps in the flowchart of the drawings are shown in sequence as indicated by arrows, these steps are not necessarily performed in sequence as indicated by arrows. Unless explicitly stated herein, the execution of these steps is not strictly limited in sequence but may be performed in other sequences. Moreover, at least part of the steps in the flowchart of the drawings may include a plurality of sub-steps or stages, which are not necessarily completed at the same time, but may be performed at different times, and the perform order thereof is not necessarily sequentially, but may be performed in turn or alternately with at least part of the sub-steps or stages of other steps or other steps.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An image processing method comprising:
predicting a rotation angle corresponding to an image to be processed according to a rotation angle of an object in the image to be processed;
performing rotation correction on the image to be processed according to the rotation angle;
segmenting the corrected image to obtain a target region in the image to be processed; and
performing a style transfer on the target region,
wherein, when the image to be processed includes at least two objects, the predicting the rotation angle comprises:
determining the rotation angle of an object with the largest area ratio in the image to be processed as the rotation angle corresponding to the image to be processed,
fusing the rotation angles of the objects in the image to be processed, and determining the fused rotation angle as the rotation angle corresponding to the image to be processed, or
determining the rotation angles of the objects as the rotation angle corresponding to the image to be processed, respectively.

2. The method according to claim 1,
wherein the predicting of the rotation angle corresponding to the image to be processed comprises:
detecting a first object region where an object is located in the image to be processed, and
predicting a rotation angle corresponding to the first object region, which is considered as the rotation angle corresponding to the image to be processed,
wherein the first object region is an object region meeting a preset condition, and
wherein the preset condition comprises at least one of the following:
an object region at a specified position,
a region where a specified object is located,
a region where an object of a specified category is located, or
an object region satisfying a preset region size.

3. The method according to claim 1,
wherein when the rotation angles of the objects are determined as the rotation angle corresponding to the image to be processed respectively, the performing of the rotation correction on the image to be processed according to the rotation angle comprises:
performing the rotation correction on the regions where the objects are located separately according to the corresponding rotation angles respectively, and
wherein the segmenting the corrected image to be processed comprises:
segmenting the rotation corrected regions where the objects are located separately, and then fusing segmentation results of the regions where the objects are located separately to obtain the segmentation result of the image to be processed, or
merging the rotation corrected regions where the objects are located separately, and segmenting the merged rotation corrected regions to obtain the segmentation result of the image to be processed.

4. The method according to claim 2,
wherein the performing of the rotation correction on the image to be processed according to the rotation angle comprises:
performing the rotation correction on the first object region, and wherein the segmenting of the corrected image to be processed comprises:
  segmenting the corrected first object region; and
  obtaining a segmentation result of the object to be processed based on the segmentation result of the first object region.

5. The method according to claim 1, wherein the segmenting of the image to be processed comprises:
  detecting second object regions where objects are located in the image to be processed respectively;
  segmenting the second object regions respectively, or merging the second object regions to obtained a merged image and segmenting the merged image; and
  obtaining segmentation result of the image to be processed based on segmentation results of the second object regions.

6. The method according to claim 1,
wherein the segmenting of the image to be processed comprises:
  segmenting the image to be processed through an object segmentation model, and
wherein the object segmentation model is obtained by training a neural network.

7. The method according to claim 6, further comprising:
receiving a style transfer request comprising information on a specified category of the object that needs to be stylized, and
wherein the target region comprises a region where an object of a specified category is located in the image to be processed.

8. An image processing method comprising:
predicting a rotation angle corresponding to an image to be processed according to a rotation angle of an object in the image to be processed;
performing rotation correction on the image to be processed according to the rotation angle;
segmenting the corrected image to obtain a target region in the image to be processed; and
performing a style transfer on the target region,
wherein the predicting of the rotation angle corresponding to the image to be processed comprises:
  predicting the rotation angle corresponding to the image to be processed through an angle prediction model,
wherein the angle prediction model comprises an image feature extraction module, and
wherein a number of batch normalization (BN) layers in at least one feature extraction unit of the image feature extraction module is less than a set value.

9. An image processing method comprising:
segmenting an image to be processed through an object segmentation model to obtain a target region in the image to be processed, wherein the object segmentation model is obtained by training a neural network; and
performing a style transfer on the target region,
wherein the object segmentation model includes a pyramid scene parsing network (PSPNet),
wherein a number of layers in a pyramid pooling module in the PSPNet is less than a set number.

10. An image processing method comprising:
segmenting an image to be processed through an object segmentation model to obtain a target region in the image to be processed, wherein the object segmentation model is obtained by training a neural network; and
performing a style transfer on the target region,
wherein the performing of the style transfer on the target region comprises:
  performing an image style transfer on the target region through a style transfer model,
wherein the style transfer model comprises a generative adversarial network (GAN), and a network structure of a generator in the GAN satisfies any of the following conditions:
  including a convolution layer, a residual network, and a deconvolution layer cascaded sequentially,
  including a convolution layer and a deconvolution layer cascaded sequentially,
  including a convolution layer, a depth-wise convolution layer, and a deconvolution layer cascaded sequentially, and
  including a convolution layer, a depth-wise convolution layer, a residual network and a deconvolution layer cascaded sequentially, and
wherein a number of channels in at least one convolution layer being less than a set number.

11. An image processing method comprising:
segmenting an image to be processed through an object segmentation model to obtain a target region in the image to be processed, wherein the object segmentation model is obtained by training a neural network;
performing a style transfer on the target region;
segmenting the image to be processed through the object segmentation model to obtain an object probability distribution map corresponding to each image style included in an image obtained after the image to be processed is stylized, where each pixel point in the object probability distribution map represents a probability that a pixel point corresponding to an element point in the image to be processed belongs to a pixel point of a segmentation category corresponding to the image style; and
fusing the stylized images corresponding to the image styles of the image to be processed to obtain an object image, based on the object probability distribution map corresponding to each image style, and
wherein the fusing the stylized images corresponding to the image styles of the image to be processed to obtain the object image, based on the object probability distribution map corresponding to each image style comprises:
  using the object probability distribution map corresponding to each image style as a weight map of the corresponding stylized image, and
  weighted summing pixel values of pixel points in the stylized images respectively to obtain the pixel value of a corresponding pixel point in the target image.

12. An electronic device, comprising:
a processor; and
a memory coupled to the processor,
wherein the memory is configured to store a machine-readable instruction,
wherein the processor is configured, when executing the machine-readable instruction, to cause the electronic device to:
  predict a rotation angle corresponding to an image to be processed according to a rotation angle of an object in the image to be processed,
  perform rotation correction on the image to be processed according to the rotation angle,
  segment the corrected image to obtain a target region in the image to be processed, and
  perform a style transfer on the target region, and wherein, when the image to be processed includes at least two objects, the processor is configured, when executing the machine-readable instruction, to further cause the electronic device to:
  determine the rotation angle of an object with the largest area ratio in the image to be processed as the rotation angle corresponding to the image to be processed,
  fuse the rotation angles of the objects in the image to be processed, and determining the fused rotation angle as the rotation angle corresponding to the image to be processed, or
  determine the rotation angles of the objects as the rotation angle corresponding to the image to be processed, respectively.

13. A non-transitory computer-readable storage medium, on which a machine-readable instruction is stored, and when the machine-readable instruction is executed by a processor, the processor is configured to perform the method according to claim 1.

* * * * *